US006746114B2

(12) United States Patent
Takahashi et al.

(10) Patent No.: US 6,746,114 B2
(45) Date of Patent: Jun. 8, 2004

(54) INK SET, PROCESS FOR FORMING COLORED PORTION AND INK-JET RECORDING APPARATUS

(75) Inventors: Katsuhiko Takahashi, Kanagawa (JP); Shinichi Tochihara, Kanagawa (JP); Yutaka Kurabayashi, Tokyo (JP); Hiroshi Tomioka, Tokyo (JP); Masashi Ogasawara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/137,377

(22) Filed: May 3, 2002

(65) Prior Publication Data

US 2003/0007051 A1 Jan. 9, 2003

(30) Foreign Application Priority Data

May 10, 2001 (JP) ........................................ 2001-140465

(51) Int. Cl.[7] .................................................. B41J 2/01
(52) U.S. Cl. .......................... 347/100; 347/101; 347/95; 106/31.13
(58) Field of Search ............................ 347/100, 96, 95, 347/101; 106/31.13, 31.6

(56) References Cited

U.S. PATENT DOCUMENTS

| 4,202,870 A | 5/1980 | Weber et al. | 423/630 |
|---|---|---|---|
| 4,242,271 A | 12/1980 | Weber et al. | 260/448 |
| 4,433,048 A | 2/1984 | Solberg et al. | 430/434 |
| 4,694,302 A | 9/1987 | Hackleman et al. | |
| 5,409,529 A | 4/1995 | Nagashima et al. | 106/22 |
| 5,415,686 A | 5/1995 | Kurabayashi et al. | 106/26 R |
| 5,439,515 A | 8/1995 | Kurabayashi et al. | 106/20 R |
| 5,478,383 A | 12/1995 | Nagashima et al. | 106/22 |

(List continued on next page.)

FOREIGN PATENT DOCUMENTS

| EP | 1099732 A1 * | 5/2001 | ........... C09D/11/00 |
|---|---|---|---|
| JP | 55-65269 A | 5/1980 | |
| JP | 55-66976 A | 5/1980 | |
| JP | 55-150396 A | 11/1980 | |
| JP | 56-120508 A | 9/1981 | |
| JP | 63-22681 A | 1/1988 | |
| JP | 63-60783 A | 3/1988 | |
| JP | 63-299971 A | 12/1988 | |
| JP | 64-9279 A | 1/1989 | |
| JP | 64-63185 A | 3/1989 | |
| JP | 4-259590 A | 9/1992 | |
| JP | 5-16015 B2 | 3/1993 | |
| JP | 6-92010 A | 4/1994 | |
| JP | 8-72393 A | 3/1996 | |
| JP | 8-224955 A | 9/1996 | |

OTHER PUBLICATIONS

"Porous structure of aluminum hydroxide and its content of pseudoboehmite," Roček, et al., Applied Catalysis, 74, 1991, Elsevier Science Publishers B.V., Amsterdam, pp. 29–36.

"The Determination of Pore Volume and Area Distributions in Porous Substances. I. Computations from Nitrogen Isotherms," Barrett, et al., The Journal of the American Chemical Society, vol. LXXIII, Jan.–Mar. 1951, pp. 373–380.

Primary Examiner—Stephen D. Meier
Assistant Examiner—Manish Shah
(74) Attorney, Agent, or Firm—Fitzpatrick, Cella, Harper & Scinto

(57) ABSTRACT

The invention provides an ink set, a process for forming a colored portion and an ink-jet recording apparatus which are used for obtaining higher-quality ink-jet recorded articles. The ink set includes an aqueous ink containing at least an ultrafinely particulate pigment as a coloring material and an aqueous liquid composition containing fine particles, dispersed therein and electrically charged at the surface in a polarity opposite to the ink.

23 Claims, 12 Drawing Sheets

U.S. PATENT DOCUMENTS

| | | |
|---|---|---|
| 5,549,740 A | 8/1996 | Takahashi et al. ............. 106/20 |
| 5,614,007 A | 3/1997 | Kurabayashi et al. .......... 106/22 |
| 5,618,338 A | 4/1997 | Kurabayashi et al. .......... 106/26 |
| 5,624,484 A | 4/1997 | Takahashi et al. ........ 106/31.75 |
| 5,640,187 A | 6/1997 | Kashiwazaki et al. ....... 347/101 |
| 5,651,814 A | 7/1997 | Shimomura et al. ..... 106/31.36 |
| 5,700,314 A | 12/1997 | Kurbayashi et al. ..... 106/31.27 |
| 5,792,249 A | 8/1998 | Shirota et al. ........... 106/31.27 |
| 5,835,116 A | 11/1998 | Sato et al. .................... 247/98 |
| 5,944,883 A * | 8/1999 | Saibara et al. ........... 106/31.86 |
| 5,985,975 A | 11/1999 | Kurabayashi et al. ........ 524/462 |
| 6,027,210 A | 2/2000 | Kurabayashi et al. ........ 347/100 |
| 6,238,045 B1 | 5/2001 | Ono et al. ..................... 347/96 |
| 6,341,855 B1 | 1/2002 | Kurabayashi ................ 347/100 |
| 6,367,921 B1 | 4/2002 | Kurabayashi et al. ........ 347/101 |
| 6,398,355 B1 | 6/2002 | Shirota et al. .............. 347/100 |
| 6,399,674 B1 | 6/2002 | Kashiwazaki et al. ....... 523/161 |
| 6,460,989 B1 | 10/2002 | Yano et al. .................. 347/101 |

* cited by examiner

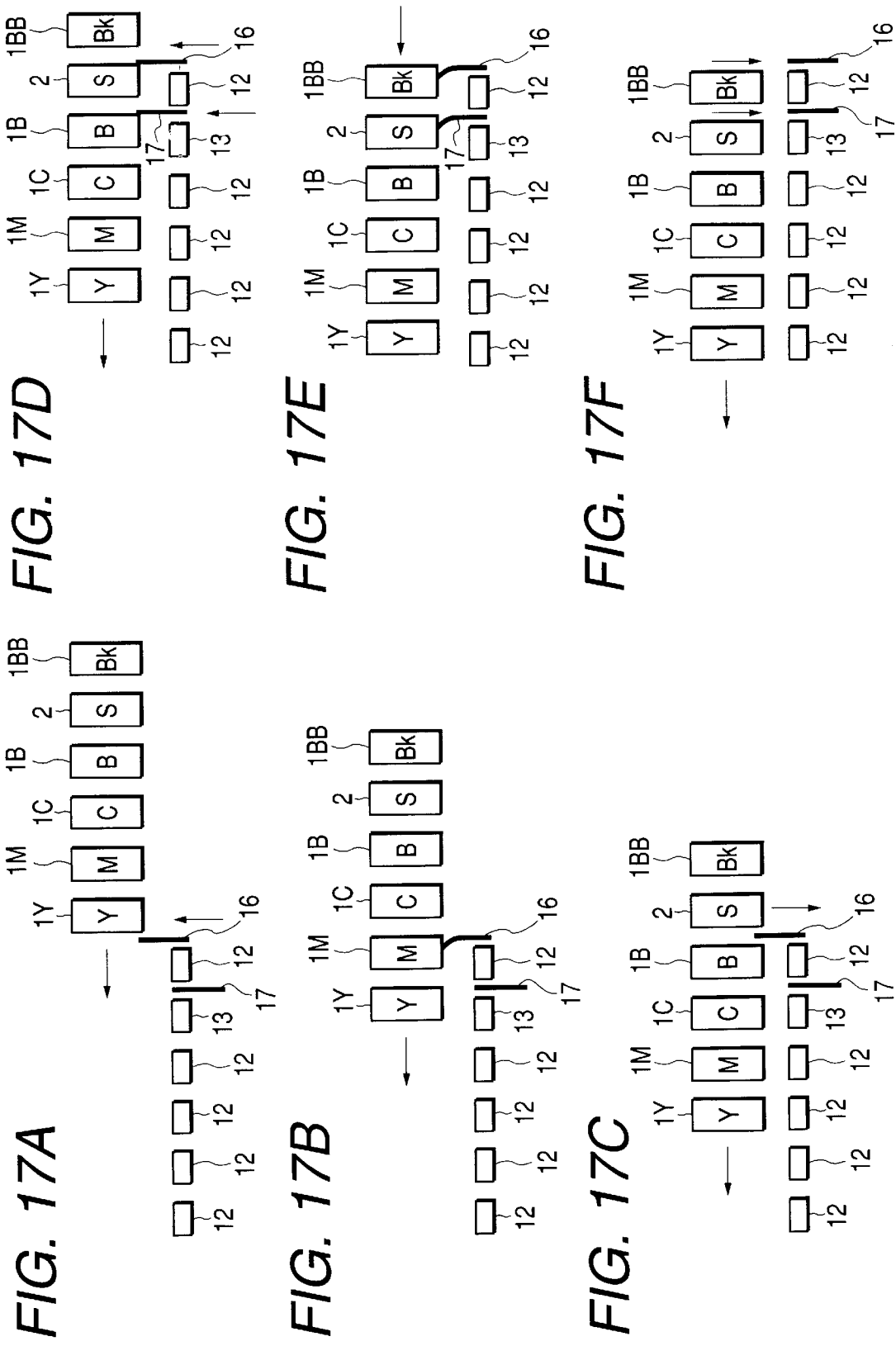

INK SET, PROCESS FOR FORMING COLORED PORTION AND INK-JET RECORDING APPARATUS

BACKGROUND OF THE INVENTION

1. Field of the Invention

The present invention relates to an ink set, a process for forming a colored portion and an ink-jet recording apparatus, and particularly to an ink set which can form excellent ink-jet recorded articles that have a wide color reproduction range, are excellent in color uniformity, do not cause bleeding between inks of different colors, have little stripe irregularity at solid printed areas and also have good weather resistance (light fastness, gas (ozone) fastness and water fastness) and rub-off resistance on plain paper, a process for forming a colored portion and an ink-jet recording apparatus.

2. Related Background Art

The conventional inks used in ink-jet recording methods generally comprise water as a principal component and a water-soluble high-boiling solvent such as a glycol for the purpose of preventing drying of the inks and clogging of orifices. When such an ink is used to conduct recording on a recording medium, therefore, such problems that sufficient fixing ability is not achieved, and an uneven image occurs, which is considered to be attributable to uneven distribution of a filler and/or a size on recording paper as a recording medium, may arise in some cases.

On the other hand, in recent years, there has been a strong demand for requiring high image quality of the same level as that of a silver salt photograph for ink-jet recorded articles. There have hence been very high technical demands for heightening the optical density of ink-jet recorded images, widening a color reproduction range and improving the color evenness of the recorded articles.

Under such circumstances, various proposals have heretofore been made for the purpose of stabilizing an ink-jet recording process and improving the quality of recorded articles by the ink-jet recording process. As one of proposals as to recording media, has proposed a method of coating the surface of a paper substrate of a recording medium with a filler and/or a size. For example, disclosed herein are techniques in which porous fine particles, which adsorb a coloring material, are coated as the filler on the paper substrate to form an ink-receiving layer by the porous fine particles. Coated paper for ink-jet, and the like are sold as recording media using these technique. Some of other representative proposals are described below.

(1) Methods of Adding a Volatile Solvent or Penetrable Solvent into an Ink:

As a means for improving the fixing ability of an ink to a recording medium, Japanese Patent Application Laid-Open No. 55-65269 discloses a method of adding a compound capable of enhancing penetrability, such as a surfactant, to an ink. Japanese Patent Application Laid-Open No. 55-66976 discloses the use of an ink comprising a volatile solvent as a main component.

(2) Methods of Mixing an Ink and a Liquid Composition, which Reacts with the Ink, on a Recording Medium:

In order to improve an optical density and water fastness of an image, and prevent bleeding, there have been proposed methods of applying a liquid composition, which can improve the image, to a recording medium prior to jetting of an ink or after the jetting.

For example, Japanese Patent Application Laid-Open No. 63-60783 discloses a method in which a liquid composition containing a basic polymer is applied to a recording medium, and recording is then conducted with an ink containing an anionic dye. Japanese Patent Application Laid-Open No. 63-22681 discloses a recording method in which a first liquid composition containing a reactive chemical species and a second liquid composition containing a compound capable of reacting with the reactive chemical species are mixed on a recording medium. Further, Japanese Patent Application Laid-Open No. 63-299971 discloses a method in which a liquid composition containing an organic compound having two or more cationic groups per molecule is applied to a recording medium, and recording is then conducted with an ink containing an anionic dye. Japanese Patent Application Laid-Open No. 64-9279 discloses a method in which an acidic liquid composition containing succinic acid or the like is applied to a recording medium, and recording is then conducted with an ink containing an anionic dye.

Further, Japanese Patent Application Laid-Open No. 64-63185 discloses a method in which a liquid composition, which insolubilizes dyes, is applied to a recording medium prior to application of an ink. Further, Japanese Patent Application Laid-Open No. 8-224955 discloses a method in which a liquid composition containing cationic substances different in molecular weight distribution range from each other is used together with an ink containing anionic compound. Japanese Patent Application Laid-Open No. 8-72393 discloses a method in which a liquid composition containing a cationic substance and finely ground cellulose is used together with an ink. In both publications, it is described that an image high in optical density and good in image quality and water fastness and also in color reproducibility and resistance to bleeding is obtained. Further, Japanese Patent Application Laid-Open No. 55-150396 discloses a method in which recording is conducted with a dye ink on a recording medium, and a water-proofing agent, which forms lake with a dye, is then applied, to propose that water fastness is imparted to the resulting recorded image.

(3) Methods of Mixing an Ink with a Liquid Composition Containing Fine Particles on a Recording Medium:

Japanese Patent Application Laid-Open No. 4-259590 discloses a method in which a colorless liquid containing colorless fine particles composed of an inorganic substance is applied to a recording medium, and an non-aqueous recording liquid is then applied. Japanese Patent Application Laid-Open No. 6-92010 discloses a method in which a solution containing fine particles or a solution containing fine particles and a polymeric binder is applied to a recording medium, and an ink containing a pigment, a water-soluble resin, a water-soluble solvent and water is then applied. In both publications, it is described that an image good in image quality and coloring properties is obtained irrespective of the kind of recording paper.

(Background Art)

The present inventors have repeatedly carried out investigations as to such various ink-jet recording techniques as described above. As a result, it has been found that although excellent effects can be recognized with respect to their respective technical objects, other ink-jet recording properties may be deteriorated in some cases in exchange for it. For example, the above-described recording medium (hereinafter referred to as coated paper) obtained by coating the surface of a paper substrate of a recording medium with a filler and/or a sizing agent is recognized as a technique with which a high-quality image can be formed.

In general, in order to obtain an image high in saturation, it has been known that a coloring material is preferably retained on the surface of a recording medium in a monomolecular state without being aggregated. Porous fine particles on the coated paper have such that function. In order to achieve high optical density and saturation of the image by a coloring material in an ink applied, however, it is indispensable to form such a thick ink-receiving layer that the paper substrate is covered with a great amount of the porous fine particles. As a result, there has been offered a problem that the texture of the paper substrate is lost. The present inventors have inferred that the necessity of such a thick ink-receiving layer that the texture of the paper substrate is lost is attributable to the fact that the coloring material is not effectively adsorbed on the porous fine particles.

Assuming coated paper having an ink-receiving layer, it will be explained in the following description. FIG. 9 typically illustrates a section of the coated paper in the vicinity of the surface thereof. In FIG. 9, reference numerals 901 and 903 indicate a paper substrate and an ink-receiving layer, respectively. The ink-receiving layer 903 generally has porous fine particles 905 and an adhesive 907 for immobilize them. When an ink is applied to the ink-receiving layer 903, the ink penetrates into voids among the porous fine particles 905 by a capillary phenomenon to form ink-penetrated portions 909. As illustrated in FIG. 9, the porous fine particles in the ink-receiving layer are topically different in density from each other, and so the penetration of the ink by the capillary phenomenon varies with the locality. Therefore, the coloring material cannot evenly contact with the surfaces of the porous fine particles in the course of the penetration of the ink, so that the coloring material is not efficiently adsorbed on the porous fine particles.

Further, the penetration of the ink is partially prevented by the adhesive 907, and so portions into which the ink cannot penetrate are present in the ink-receiving layer 903, and portions which cannot contribute to coloring are thus produced. More specifically, in the conventional coated paper, the coloring material cannot be efficiently adsorbed in a monomolecular state according to the amount of the porous fine particles for the above-described reasons. As a result, a great amount of the porous fine particles are required to provide a high-quality image, so that the texture of the paper substrate is impaired.

Although the fixing ability of an ink to a recording medium is improved by adopting the above technique (1), the optical density of an image formed and a color reproduction range, which is important for recording on plain paper and recording of color images, may have been lowered in some cases. According to the technique (2), a coloring material in an ink can be kept on the surface of a recording medium, and so a recorded article having high in optical density of images can be provided. However, a color reproduction range and saturation may have been lowered in some cases, which would be considered to be attributable to aggregation of a coloring material on the surface of a recording medium. According to the prior art described in the item (3), the surface profile of a recording medium is improved by application of the solution containing fine particles. However, any high-definition image of the same level as in coated paper has been unable to be obtained. In the non-aqueous recording liquid in particular, problems are left on its degree of freedom because selectivity of a coloring material, application method of a recording liquid, etc. are limited. Since some problems have been left on the conventional methods as described above, the present inventors have come to have recognition that the development of new ink-jet recording techniques is necessary for ink-jet recorded articles of higher quality required in recent years.

In the development of coloring materials of inks for office or personal ink-jet printers on the other hand, the development of a pigment system has also been vigorously made together with a dye system, which has been the main system over a long period of time, in recent years. In particular, there is a strong demand for future development from the viewpoint of high weather resistance (water fastness, light fastness and gas (ozone) fastness) which is characteristic of the pigment system.

Inks using black carbon black have been already put to practical use at present. However, inks using organic pigments of chromatic colors such as cyan, magenta and yellow have not yet been realized in the field of office and personal printers in respects of coloring of recorded images, and the like though they have been realized in large-size printers and the like utilized for posters and advertisements. However, the development of a production process of fine particles has been advanced in chromatic organic pigments used in ink-jet in recent years, and so-called ultrafinely particulate color organic pigments have appeared. The ultrafinely particulate color organic pigments are improved in print quality such as coloring ability and transparency on recording media such as coated paper and glossy paper for ink-jet, which have heretofore been poor compared with dye inks. However, such pigments have not succeeded in forming recorded images having sufficient coloring property on recording media poor in liquid absorbency and pigmenting, such as plain paper.

SUMMARY OF THE INVENTION

The present inventors have carried out investigations repeatedly on the basis of such findings as described above. As a result, it has been found that an aqueous liquid composition containing fine particles having an action of adsorbing a coloring material on its surface, and an aqueous ink containing an ultrafinely particulate pigment are used, and the liquid composition is brought into contact with the ink in a liquid state, whereby the ultrafinely particulate pigment efficiently reacts with the fine particles to improve the optical density and saturation of an image formed on a recording medium poor in liquid absorbency and pigmenting, such as plain paper and to bring about an excellent inhibitory effect on bleeding, thus leading to completion of the present invention.

It is therefore an object of the present invention to provide an ink set used in providing a high-quality ink-jet recorded article, a process for forming a colored portion and an ink-jet recording apparatus.

Another object of the present invention is to provide an ink set which can form excellent ink-jet recorded articles that have a wide color reproduction range, are excellent in color uniformity, do not cause bleeding between inks of different colors, have little stripe irregularity at solid printed areas and also have good weather resistance (light fastness, gas (ozone) fastness and water fastness) and rub-off resistance on plain paper, a process for forming a colored portion and an ink-jet recording apparatus.

The above objects can be achieved by the present invention described below.

In an embodiment of the present invention, there is provided an ink set comprising an aqueous ink containing at least an ultrafinely particulate pigment as a coloring material and an aqueous liquid composition containing fine particles dispersed therein and electrically charged at the surface in a polarity opposite to the ink, in a dispersed state.

In another embodiment of the present invention, there is provided a process for forming a colored portion, comprising the steps of:

(i) applying an anionic or cationic aqueous ink containing an ultrafinely particulate pigment as a coloring material to a recording medium; and (ii) applying an aqueous liquid composition containing fine particles dispersed therein and electrically charged at the surface in a polarity opposite to the aqueous ink, in a dispersed state to the recording medium, wherein the ink and the liquid composition are applied so as to come into contact with each other in a liquid state on the surface of the recording medium.

In a further embodiment of the present invention, there is provided an ink-jet recording apparatus comprising a first recording unit equipped with a container part which contains an anionic or cationic aqueous ink containing an ultrafinely particulate pigment as a coloring material and an ink-jet head for ejecting the ink, and a second recording unit equipped with a composition container part which contains an aqueous liquid composition containing fine particles dispersed therein and electrically charged at the surface in a polarity opposite to the ink, and an ink-jet head for ejecting the liquid composition.

In a still further embodiment of the present invention, there is provided an ink-jet recording apparatus comprising an ink container part which contains an anionic or cationic aqueous ink containing an ultrafinely particulate pigment as a coloring material, a liquid composition container part which contains an aqueous liquid composition containing fine particles dispersed therein electrically charged at the surface in a polarity opposite to the ink, and ink-jet heads for independently ejecting the ink contained in the ink container part and the liquid composition contained in the liquid composition container part.

In present specification, the term "a reaction of a coloring material (ultrafinely particulate pigment) with fine particles" means ionic bonding, physical/chemical adsorption, absorption, adhesion and any other interaction between both in addition to covalent bonding between both.

BRIEF DESCRIPTION OF THE DRAWINGS

FIGS. 4A, 4B, 4C and 4D typically illustrate a wiping operation of the ink-jet printer shown in FIG. 1, in which FIG. 4A shows the movement of respective heads from a printing region side to a home position and the lifting of a blade for ink, FIG. 4B shows the wiping of printing heads, FIG. 4C shows the wiping of a liquid-composition-ejecting head, and FIG. 4D shows the lowering of both blades.

FIGS. 5A, 5B, 5C and 5D typically illustrate a wiping operation of the ink-jet printer shown in FIG. 1, in which FIG. 5A shows the lifting of both blades, FIG. 5B shows the movement of respective heads from a home position to a printing region side, FIG. 5C shows the lowering of a liquid-composition-ejecting head, and FIG. 5D shows the wiping of printing heads and the lowering of a blade for ink.

FIGS. 6A, 6B, 6C and 6D typically illustrate a wiping operation of the ink-jet printer shown in FIG. 1, in which FIG. 6A shows the lifting of a blade for ink, FIG. 6B shows the movement of respective heads from a home position side to a printing region side and the wiping of printing heads, FIG. 6C shows the movement of the respective heads from the printing region side to the home position side, the stand-by of the blade for ink, and the lifting of a liquid-composition-ejecting head, and FIG. 6D shows the movement of the respective heads to the home position side and the wiping of the liquid-composition-ejecting head.

FIGS. 17A, 17B, 17C, 17D, 17E and 17F typically illustrate a wiping operation of the ink-jet printer shown in FIG. 16, in which FIG. 17A shows the lifting of a blade for ink, FIG. 17B shows the wiping of printing heads, FIG. 17C shows the lowering of the blade for ink, FIG. 17D shows the lifting of both blades after a liquid-composition-ejecting head goes into proper position, FIG. 17E shows the wiping of heads for the liquid composition and a second black ink, and FIG. 17F shows the lowering of both blades.

DETAILED DESCRIPTION OF THE INVENTION

The present invention will hereinafter be described in more detail by the preferred embodiments of the invention.

As a preferred embodiment of a process for forming a colored portion on a recording medium, is mentioned a process comprising the steps of (i) applying an aqueous ink containing a coloring material to a recording medium and (ii) applying the above-described liquid composition according to the present invention in a dispersed state to the recording medium, wherein the ink and the liquid composition are applied so as to come into contact with each other in a liquid state on the surface of the recording medium. By adopting such an embodiment, excellent ink-jet recorded articles that have a wider color reproduction range, are excellent in prevention of bleeding and color uniformity, have little stripe irregularity at solid printed areas and also have good rub-off resistance can be stably provided.

As an embodiment of an ink set according to the present invention, by which the above objects can be achieved, is mentioned a combination of an ink containing a coloring material and the above-described liquid composition according to the present invention. By using the ink set of such an embodiment, excellent ink-jet recorded articles that have a wider color reproduction range, are excellent in prevention of bleeding and color uniformity, have little stripe irregularity at solid printed areas and also have good rub-off resistance can be stably provided. The ink and liquid composition themselves used in recording are extremely simple in composition as described above, and hence bring about an effect that ink-jet recording can be performed with high quality and reliability.

(Description of Mechanism)

The reason why such an excellent effect can be achieved by the present invention is not clearly known. However, the present inventors consider that it is due to the following reason.

The mechanism of recording in the present invention is first described with reference to FIG. 13 to FIGS. 14A through 14D and FIG. 14CP. Here, the description is given on the case where a aqueous ink containing ultrafinely particulate pigment having an anionic group is used as an ink, and at the same time an aqueous liquid composition containing fine particles cationically charged at the surfaces thereof in a dispersed state is used as a liquid composition.

A recorded image according to the present invention will hereinafter be described with reference to FIG. 13.

Prior to the description, the definition of a term is given. The term "monomolecular state" as used herein means that the ultrafinely particulate pigment as a coloring material is almost kept in a state dispersed in an ink. At this time, if the coloring material undergoes some aggregation, such a coloring material is included in this monomolecular state so far as the saturation of an image formed by such an ink is not lowered.

Figure 13:
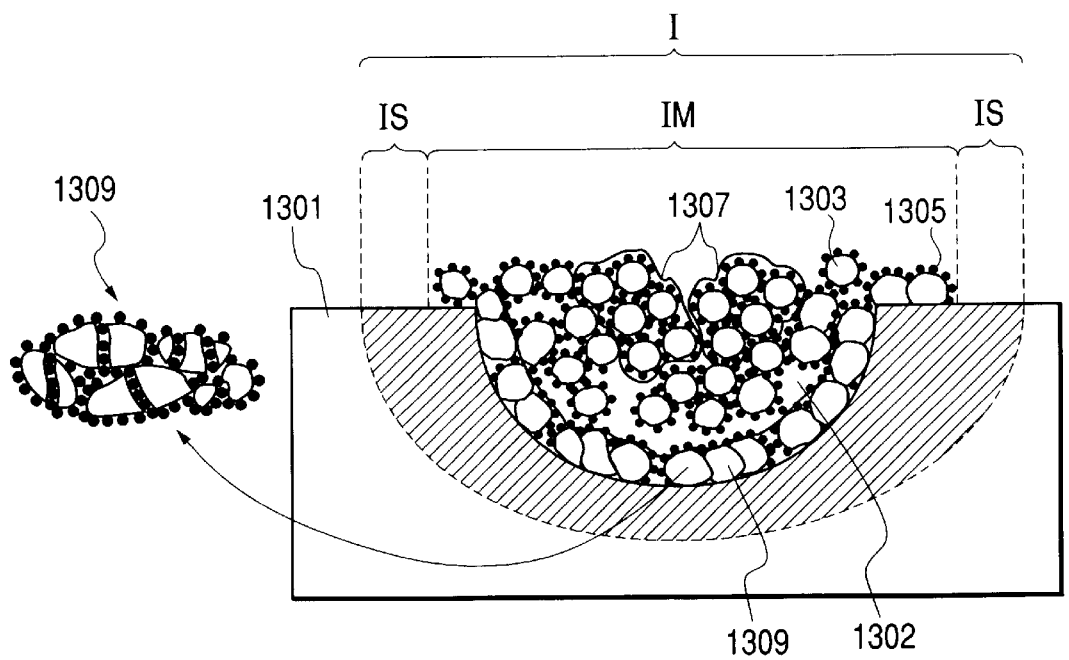
FIG. 13 is a typical cross-sectional view illustrating a state of a colored portion in an ink-jet recorded image according to the present invention.

FIG. 13 typically illustrates a state that a colored portion I of a recorded image according to the present invention is formed of a main image portion IM and a peripheral portion IS thereof. In FIG. 13, reference numeral 1301 indicates a recording medium, and 1302 voids defined among fibers of the recording medium. Reference numeral 1303 designates fine particles typically illustrated, on which a coloring material 1305 is chemically adsorbed. As illustrated in FIG. 13, the main image portion IM in the recorded image according to the present invention is formed by the fine particles 1303 on the surfaces of which the coloring material 1305 has been uniformly adsorbed in a monomolecular or near monomolecular state (hereinafter referred to as "monomolecular state" merely), and aggregates 1307 of the fine particles, in which the monomolecular state of the coloring material is kept. Reference numeral 1309 indicates aggregates of the fine particles themselves present in the vicinity of fibers of the recording medium within the main image portion IM. The main image portion IM is formed by the steps of causing the fine particles 1303 to be physically or chemically adsorbed on the fibers of the recording medium, and causing the coloring material 1305 to be adsorbed on the fine particles 1303 in a liquid—liquid state. Therefore, the coloring properties of the coloring material itself are scarcely impaired, and the formation of an image high in optical density of image and saturation and wide in color reproduction range like that in coated paper is feasible even on recording media easy to penetrate an ink, such as plain paper.

On the other hand, the coloring material 1305 remaining in the ink without being adsorbed on the surfaces of the fine particles 1303 penetrates in both lateral and depthwise directions, and so minute feathering of the ink is formed at the peripheral portion 1S. Since the coloring material is left in the vicinity of the surface of the recording medium 1301, and the minute feathering of the ink is formed at the peripheral portion as described above, the formation of an image little in whitish haze and color irregularity and excellent in color evenness is feasible even in an image region great in the quantity of an ink applied, such as a shadow portion or solid print portion. When the recording medium 1301 is that having a permeability to the ink and liquid composition as illustrated in FIG. 13, the penetration of the ink and liquid composition components into the interior of the recording medium is not always prevented in this embodiment, but the penetration is allowable to some extent.

When the liquid composition according to the present invention is used, pores of certain sizes are formed in the interior of the aggregates 1309 of the fine particles present in the vicinity of the surfaces of the recording medium when they are formed. The coloring material 1305 present by itself in the above ink penetrates into the interiors of the pores in the aggregates 1309 of the fine particles upon the penetration into the recording medium and is adsorbed in an ideal monomolecular state in the vicinity of the entrances of the pores and/or the inner walls thereof, so that a larger amount of coloring material can be retained in the vicinity of the surface of the recording medium, whereby a recorded articles having far excellent coloring property can be provided.

Figure 14A:
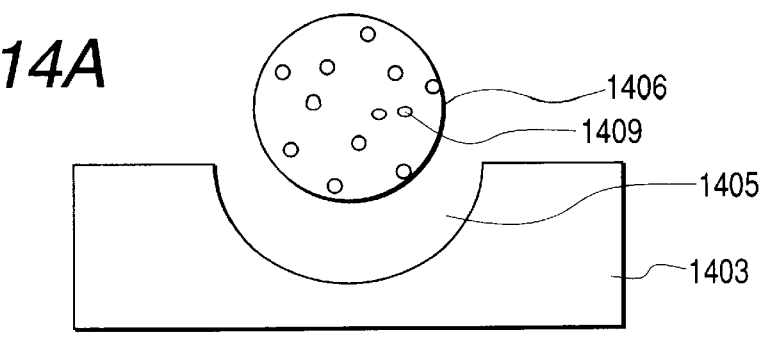
FIGS. 14A, 14B, 14C, 14CP and 14D are schematic flow charts illustrating a forming process of a colored portion of an ink-jet recorded image according to the present invention.
Figure 14B:
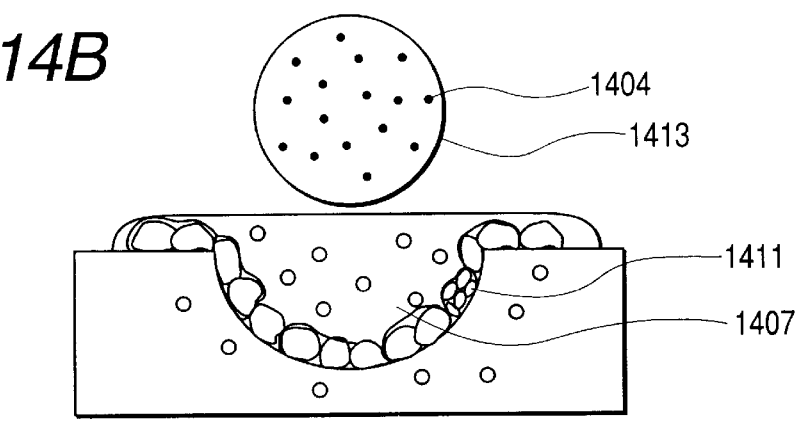
Figure 14C:
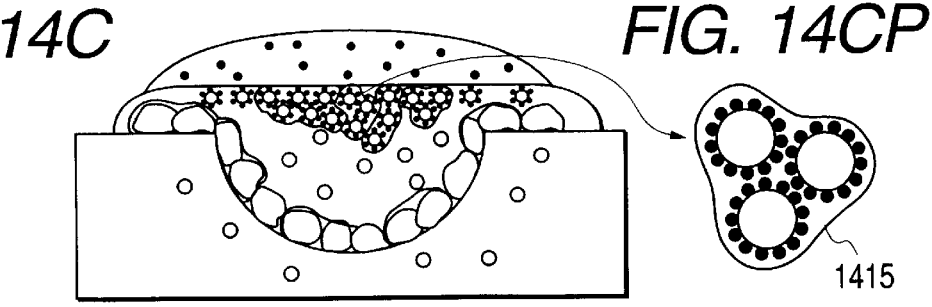
Figure 14D:
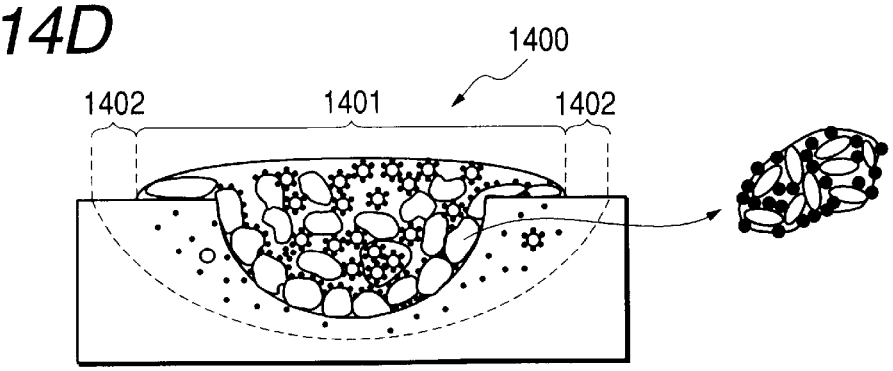

FIGS. 14A to 14D are schematic cross-sectional views of a colored portion 1400 of an ink-jet recorded image according to an embodiment of the present invention and schematic flow charts illustrating a forming process thereof. In FIG. 14D, reference numeral 1401 indicates a portion (hereinafter referred to as "reacted portion") mainly containing a reaction product of an ink with a liquid composition, for example, a reaction product of a coloring material with fine particles, and corresponding to the main image portion IM in FIG. 13. Reference numeral 1402 designates a portion (hereinafter referred to as "ink runoff portion") formed by an ink which has substantially not participated in the reaction with the liquid composition and run off to the periphery of the reacted portion 1401, and corresponding to the peripheral portion IS in FIG. 13. Such a colored portion 1400 is formed, for example, in the following manner. In FIG. 14A, reference numeral 1405 indicates a void defined between fibers of a recording medium typically illustrated.

A liquid composition 1406 reactive to a coloring material 1404 is first applied as a droplet to a recording medium 1403 (FIG. 14A). As a result, a pool 1407 of the liquid composition is formed (FIG. 14B). In the pool 1407, fine particles 1409 in the vicinity of the fiber surfaces of the recording medium are physically or chemically adsorbed on the surfaces of the fibers of the recording medium. At this time, it is considered that the dispersed state of the fine particles is made unstable to form aggregates 1411 of the fine particles themselves. On the other hand, it is considered that the fine particles 1409 located apart from the fibers in the pool 1407 are kept in the original dispersed state.

An ink 1413 is then applied as a droplet to the recording medium 1403 (FIG. 14B). As a result, the coloring material 1404 is chemically adsorbed on the fine particles 1409 at the interface between the ink 1413 and the pool 1407. Since this reaction is a reaction (liquid—liquid reaction) between liquids, the coloring material 1404 is considered to be uniformly adsorbed in a monomolecular state on the surfaces of the fine particles 1409 (FIG. 14CP). More specifically, it is considered that the coloring material itself does not undergo aggregation at the vicinity of the surfaces of the fine particles, or it is slight if aggregates. As a result, a great number of fine particles on which the coloring material 1404 has been adsorbed in the monomolecular state are formed on the surface layer of the reacted portion 1401, and so the coloring material can be left in the monomolecular state on the surface which most affects coloring. Therefore, a recorded image high in optical density of image and saturation can be formed.

It is considered that the fine particles on which the coloring material 1404 has been adsorbed then aggregate by themselves because their dispersed state is made unstable (FIG. 14CP). Namely, aggregates 1415 formed here also hold the coloring material in the monomolecular state in the interiors thereof. The recorded image high in optical density of image and saturation is formed by the aggregates 1415.

Further, a part of an unreacted coloring material 1404 diffuses into the pool 1407 to be adsorbed on the surfaces of unreacted fine particles 1409. As described above, the reaction is allowed to further proceed within the pool 1407, so that an image higher in optical density of image and saturation is formed. The above-described aggregates 1411 of the fine particles formed on the surfaces of fibers of the recording medium are considered to play a role of preventing the penetration of a liquid phase in the pool 1407 into the interior of the recording medium. Therefore, it is possible to mix the fine particles 1409 in the liquid composition prevented from penetrating and the coloring material 1404 in greater amounts in the pool 1407, whereby a contact probability of the coloring material 1404 with the fine particles 1409 is enhanced, and the reaction is allowed to proceed relatively uniformly and sufficiently, whereby an image more uniform and excellent in optical density of image and saturation is formed.

When the liquid composition 1406 is applied to the recording medium 1403 (FIG. 14A), or the ink 1413 is applied to the pool 1407 (FIG. 14B), the dispersion of the fine particles 1409 is made unstable by changes in dispersion medium in which the fine particles 1409 are dispersed, so that some fine particles 1409 undergo aggregation before the coloring material 1404 is adsorbed thereon. The term "changes in dispersion medium" as used herein means changes generally observed when two or more kinds of liquids are mixed with each other, for example, changes in physical properties such as the pH and solid concentration of a liquid phase, solvent composition, and dissolved ion concentration. It is considered that these changes take place rapidly and complexly to break the dispersion stability of the fine particles, thereby forming the aggregates. It is considered that these aggregates have effects of filling voids and leaving a greater amount of the fine particles, on which the coloring material has been adsorbed, in the vicinity of the surface of the recording medium. Among these aggregates formed in the pool 1407, there are those adsorbed on the recording medium and those movable in the liquid phase (having flowability). Those having flowability adsorb the coloring material in a monomolecular state on the surfaces thereof in the same manner as in the above-described reaction process of the coloring material and the fine particles to form greater aggregate mass which contributes to the enhancement of coloring. The aggregate mass is considered to move together with the liquid phase upon the penetration of the liquid phase along the fibers so as to fill the voids to smooth the surface of the recording medium, thereby contributing to the formation of an image more uniform and high in optical density.

Although it is apparent from the below-described result that the image of high coloring is obtained by the present invention, this is considered to be attributable to the fact that the coloring material is adsorbed in a monomolecular state on the fine particles or the fine particle aggregates to remain in the vicinity of the surface of the recording medium in that state. The fine particles, on which the coloring material has been adsorbed in the monomolecular state, and which remain on the surface of the recording medium, are fixed to the surface of the recording medium, thereby improving the fastness properties of the resulting image, such as rub-off resistance and water fastness.

Incidentally, the description has been given above as to the case where the liquid composition and the ink are applied to the recording medium in that order. However, the order of the liquid composition and the ink applied to the recording medium is not limited thereto so far as the liquid—liquid reaction of the ink with the liquid composition is achieved. Therefore, they may be applied in order of the ink and the liquid composition. As illustrated in FIG. 14B, at least a part of the fine particles in the liquid composition applied to the recording medium are considered to penetrate into the interior of the recording medium with the penetration of the liquid medium into the interior of the recording medium. On the other hand, as clearly illustrated in FIG. 14D, the coloring material is fully considered to be adsorbed or bonded in a monomolecular state to the fine particles previously penetrated. As described above, the fine particles, on which the coloring material has been adsorbed or bonded in the monomolecular state in the interior of the recording medium, are considered to also contribute to the improvement of coloring. Further, it is considered that the fixing ability is also improved by such penetration of the liquid medium.

When the liquid composition according to the present invention is used, pores of certain sizes are formed in the interior of the aggregates 1411 of the fine particles present in the vicinity of the surfaces of the recording medium when they are formed. The coloring material 1404 not adsorbed on the fine particles 1409 in the pool 1407 penetrates together with the solvent component into the interiors of the fine particle aggregates 1411 through the pores upon the penetration into the recording medium. At this time, the coloring material 1404 is adsorbed in the vicinity of the entrances of the pores in the fine particle aggregates and/or the inner walls thereof, and only the solvent component penetrates in the interior of the recording medium, whereby a greater amount of the coloring material can be efficiently adsorbed on the surfaces and interiors of the fine particle aggregates 1411 and remain in the vicinity of the surface of the recording medium. This can greatly contributes to more improvement in coloring to provide a recorded article having a wider color reproduction range.

The physical properties of the pores in the fine particle aggregates 1411 have been known to be affected by not only the fine particles contained in the liquid composition, but also the composition of the solvent, and it has been found that fine particle aggregates are formed from the liquid composition, and the pore volume of the fine particle aggregates in a specific pore radius range has very high correlation with the image forming ability on the recording medium.

In the present invention, the fine particles are reacted with the coloring material in a liquid phase, whereby the anionic coloring material comes to be adsorbed on the surfaces of the cationic fine particles.

When it is intended to achieve the adsorption of the coloring material to the same degree as in the present invention in coated paper for ink-jet, a great amount of cationic porous fine particles are required, and it is indispensable to form such a thick ink-receiving layer that covers a paper substrate, thus resulting in impairing the texture of the paper substrate in the coated paper. Since the amount of the fine particles making up the liquid composition according to the present invention can be lessened, however, image formation free of a feeling of physical disorder in the texture between a printed area and an unprinted area becomes feasible without impairing the texture of the recording medium.

The present invention seems to be similar to the method of externally adding a fine particle-containing liquid composition to an ink, which has been described in the item (3) in the prior art, in that a fine-particle-containing liquid composition and an ink are applied on the surface of a recording medium to form an image. However, the present invention uses the fine particles in the liquid composition as a means for preventing the aggregation (lake) of the coloring material by positively reacting the liquid composition with the coloring material as described above. On the other hand, in the prior art described in the item (3), the fine-particle-containing solution is applied for the purpose of improving the surface profile of a recording medium, and the idea that a chemical reaction is caused between the fine particles and the ink, which are different in polarity from each other, is not disclosed at all. A difference in quality between a recorded article according to these recording techniques and a recorded articles obtained by the present invention is apparent, which is considered to be attributable to a difference in mechanism.

The liquid composition and ink which characterize the present invention will hereinafter be described in detail.

The definition of a cationic ink or anionic ink in the present specification is first given. When the ionic characteristics of an ink are mentioned, it is well known in this technical field that the ink itself is not charged, but is neutral by itself. The term "anionic ink" or "cationic ink" as used herein means an ink that a component in the ink, for example, a coloring material has an anionic or cationic group, and these groups are adjusted so as to behave as an anionic or cationic group in the ink. With respect to an anionic or cationic liquid composition, the meaning thereof is the same as described above.

The present invention will hereinafter be described in more detail by preferred embodiment.

<Ink>

The inks used in the present invention will hereinafter be described.

(Coloring Material)

In the present invention, an ultrafinely particulate pigment is preferably used as a coloring material in an ink. It has been found that when both an ink containing this ultrafinely particulate pigment and an aqueous liquid composition containing fine particles dispersed therein and electrically charged at the surface in a polarity opposite to the ink, are used to perform recording, resistance to bleeding between inks of different colors on, particularly, plain paper is more improved than the case a publicly known dye ink or pigment ink is used as an ink. The reason for it is not clearly known, but is considered to be as follows.

(a) The ultrafinely particulate pigment is larger in specific surface area and higher in surface activity than general pigments, thereby rapidly reacting in response to changes in physical properties (pH, dissolved ion concentration, etc.) of a dispersion medium when contacted with the liquid composition to form aggregates with fine particles in the liquid composition.

(b) Since the particle diameter is smaller than general pigments, the contact surface area thereof becomes greater, whereby the adsorption with the fine particles in the liquid composition is increased to react efficiently and sufficiently.

The ultrafinely particulate pigment in the present invention is defined as one having a volume average particle diameter of 60 nm or smaller as determined by a dynamic light scattering method. As examples of more preferable ultrafinely particulate pigments, may be mentioned fine particles having a volume average particle diameter of 60 nm or smaller and a 90% cumulative particle diameter of volume particle diameter distribution of 100 nm or smaller, both, as determined by the dynamic light scattering method.

A Microtrack UPA150 (manufactured by Nikkiso Co., Ltd.) is used as a measuring instrument in the determination of the volume average particle diameter and volume particle diameter distribution. The measurement is conducted under conditions that a sample solution is diluted with ion-exchanged water and then subjected to a dispersing treatment by means of an ultrasonic cleaner so as to give a sample concentration index ranging from 0.01 to 0.1.

The ultrafinely particulate pigments may be either inorganic pigments or organic pigments. As the inorganic pigments, may be used those comprising, as a main component, carbon such as carbon black. As the organic pigments, conventionally known organic pigments having chromatic color tones such as cyan, magenta, yellow, red, green and blue are used without any limitations. These chromatic organic pigments may be used as a mixture of plural pigments.

Typical examples of the organic pigments include quinacridone pigments, quinacridonequinone pigments, dioxazine pigments, phthalocyanine pigments, anthrapyrimidine pigments, anthanthrone pigments, indanthorone pigments, flabanthrone pigments, perylene pigments, diketopyrrolopyrrol pigments, perinone pigments, quinophtharone pigments, anthraquinone pigments, thioindigo pigments, benzimidazolone pigments, isoindolinone pigments and azomethine pigments.

No particular limitation is imposed on the production process of the ultrafinely particulate pigment so far as it is a production process capable of providing fine particles having a volume average particle diameter of 60 nm or smaller, and any existing production process may be used. A particularly preferable production process is a process capable of providing those having a volume average particle diameter of 60 nm or smaller and a narrow particle size distribution because such a pigment is excellent in coloring ability and transparency as an ink.

A specific production process includes a process called a vapor-phase process. The vapor-phase process is a process comprising the steps of generating gas plasma containing at least a reactive gas, forming ultrafine particles by evaporating a raw material and passing it through the gas and modifying the ultrafine particles by passing them through the gas plasma containing at least the reactive gas.

The ultrafinely particulate pigment in the present invention may be either a self-dispersing pigment the surface of which has been modified, or a resin-dispersing pigment dispersed by a water-soluble resin or the like.

As the inks in the present invention, are used those exhibiting an anionic nature or cationic nature. The inks exhibiting the respective ionicities will hereinafter be described.

(Anionic Ink)

An anionic ink takes either form of:
an anionic self-dispersing pigment ink, or
an anionic resin-dispersing pigment ink.

An anionic self-dispersing pigment is a pigment to the surface of which at least one anionic hydrophilic group is bonded directly or through another atomic group. The anionic hydrophilic group is at least one selected from among, for example, the following hydrophilic groups, and said another atomic group is an alkylene group having 1 to 12 carbon atoms, a phenylene group which may be substituted, or a naphthylene group which may be substituted. However, the present invention is not limited thereto.

—COOM, —SO$_3$M, —SO$_2$NH$_2$, —PO$_3$HM and —PO$_3$M$_2$ wherein M is hydrogen, alkali metal, ammonium or organic ammonium.

In the case of the anionic resin-dispersing pigment ink, a dispersing agent itself may contain an anionic group, or another anionic compound may be contained in the ink when the dispersing agent has no anionic group. It goes without saying that the dispersing agent itself may contain an anionic group, and besides an anionic compound may be contained.

As a dispersing agent for pigment used, any resin may be used so far as it is a water-soluble resin. The weight average molecular weight thereof is preferably within a range of from 1,000 to 30,000, more preferably from 3,000 to 15,000. Specific examples of such water-soluble resins include block copolymers, graft copolymers and random copolymers composed of at least two monomers selected from among hydrophobic monomers such as styrene, styrene derivatives, vinylnaphthalene, vinylnaphthalene derivatives and aliphatic alcohol esters of α,β-ethylenically unsaturated carboxylic acids, and acrylic acid and derivatives thereof, maleic acid and derivatives thereof, itaconic acid and derivatives thereof, and fumaric acid and derivatives thereof, and salts of these copolymers. These resins are alkali-soluble resins which dissolve in an aqueous solution with a base dissolved therein.

Besides, homopolymers composed of a hydrophilic monomer, or salts thereof may also be used. Further, water-soluble resins such as polyvinyl alcohol, carboxymethyl cellulose and condensates of naphthalenesulfonic acid and formaldehyde may also be used.

When the dispersing agent is not an anionic polymer, it is preferable to further add an anionic compound to the inks containing the pigment described above. Examples of anionic compounds preferably used in the present invention include low-molecular anionic surfactants in addition to high-molecular substances such as the alkali-soluble resins described in the item of the dispersing agent for pigment.

Specific examples of the low-molecular anionic surfactants include disodium lauryl sulfosuccinate, disodium polyoxyethylene lauroylethanolamide sulfosuccinate, disodium polyoxyethylene alkyl-sulfosuccinates, carboxylated polyoxyethylene lauryl ether sodium salt, carboxylated polyoxyethylene tridecyl ether sodium salt, sodium polyoxyethylene lauryl ether sulfate, triethanolamine polyoxyethylene lauryl ether sulfate, sodium polyoxyethylene alkyl ether sulfates, sodium alkylsulfates and triethanolamine alkylsulfates. However, the low-molecular anionic surfactants are not limited to these compounds. The used amount of such an anionic substance as described above is preferably within a range of from 0.05 to 10% by weight, more preferably from 0.05 to 5% by weight based on the total weight of the ink. As surfactants, are preferred acetylene alcohols and acetylene glycols because penetrability into plain paper can be improved, and on one hand foaming of the liquid composition is inhibited, and foams can be quickly eliminated if foamed.

The amount of the surfactant used varies according to the kind of the dispersing agent used, but is desirably within a range of from 0.01 to 5% by weight based on the total weight of the ink. At this time, it is preferred that the amount of the surfactant added be determined in such a manner that the surface tension of the resulting ink is preferably at least 10 mN/m (dyn/cm), more preferably at least 20 mN/m (dyn/cm), particularly preferably at least 30 mN/m (dyn/cm), and the surface tension is preferably 70 mN/m (dyn/cm) or lower, because the occurrence of slippage upon printing (defective ink-droplet impact) due to wetting of an orifice can be effectively prevented in an ink-jet recording system used in the present invention.

(Cationic Ink)

A cationic ink takes either form of:
a cationic self-dispersing pigment ink, or
a cationic resin-dispersing pigment ink.

A cationic self-dispersing pigment is a pigment to the surface of which at least one cationic hydrophilic group is bonded directly or through another atomic group. Examples thereof include those obtained by bonding at least one selected from among the following quaternary ammonium groups to the surfaces thereof. However, the present invention is not limited thereto.

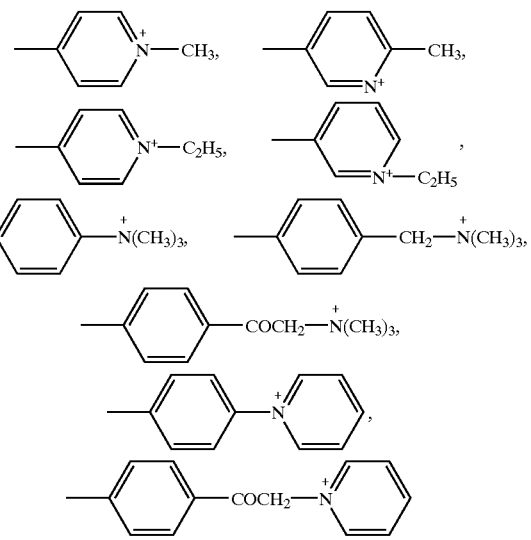

wherein R is a linear or branched alkyl group having 1 to 12 carbon atoms, a substituted or unsubstituted phenyl group, or a substituted or unsubstituted naphthyl group. Incidentally, the above-mentioned cationic groups may have, for example, NO$_3^-$ or CH$_3$COO$^-$ as a counter ion.

As a method for producing the self-dispersing pigment cationically charged with such a hydrophilic group as described above bonded to the surface thereof, description is given taking the case of a method of bonding, for example, an N-ethylpyridyl group of the structure described below. Namely, a pigment is treated with 3-amino-N-ethylpyridinium bromide.

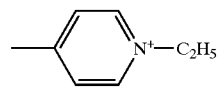

In the case of the cationic resin-dispersing pigment ink, a dispersing agent itself may contain a cationic group, or another cationic compound may be contained in the ink when the dispersing agent has no anionic group. It goes without saying that the dispersing agent itself may contain a cationic group, and besides a cationic compound may be contained.

As a dispersing agent for pigment used, any resin may be used so far as it is a water-soluble resin having the function that a pigment can be stably dispersed in water or an aqueous medium in the presence of a cationic group. Specific examples thereof may include those obtained by polymerization of a vinyl monomer and having a cationic nature in at least a part of the resulting polymer. Examples of a cationic monomer for forming the cationic moiety include salts of such tertiary amine monomers as described below, and quaternized products thereof.

Namely, there are mentioned:

N,N-dimethylaminoethyl methacrylate [$CH_2=C(CH_3)$—COO—$C_2H_4N(CH_3)_2$],

N,N-dimethylaminoethyl acrylate [$CH_2=CH$—COO—$C_2H_4N(CH_3)_2$],

N,N-dimethylaminopropyl methacrylate [$CH_2=C(CH_3)$—COO—$C_3H_6N(CH_3)_2$],

N,N-dimethylaminopropyl acrylate [$CH_2=CH$—COO—$C_3H_6N(CH_3)_2$],

N,N-dimethylacrylamide [$CH_2=CH$—$CON(CH_3)_2$],

N,N-dimethylmethacrylamide [$CH_2=C(CH_3)$—CON$(CH_3)_2$],

N,N-dimethylaminoethylacrylamide [$CH_2=CH$—CONH$C_2H_4N(CH_3)_2$],

N,N-dimethylaminoethylmethacrylamide [$CH_2=C(CH_3)$—CONH$C_2H_4$—$N(CH_3)_2$],

N,N-dimethylaminopropylacrylamide [$CH_2=CH$—CONH—$C_3H_6N(CH_3)_2$] and

N,N-dimethylaminopropylmethacrylamide [$CH_2=C(CH_3)$—CONH—$C_3H_6N(CH_3)_2$].

In the case of a tertiary amine, examples of a compound for forming a salt include hydrochloric acid, sulfuric acid and acetic acid. Examples of a compound used in quaternization include methyl chloride, dimethylsulfuric acid, benzyl chloride and epichlorohydrin. Among these, methyl chloride and dimethylsulfuric acid are preferred from the viewpoint of preparing a dispersing agent used in the present invention. Such tertiary amine salts or quaternary ammonium compounds as described above behave as cations in water, and their stably soluble region under neutralized conditions is acidic. The content of these monomers in the copolymers is preferably within a range of from 20 to 60% by weight.

Examples of other monomers used in the formation of the above-described high-molecular dispersing agents include hydrophobic monomers such as acrylic esters having a hydroxyl group, such as 2-hydroxyethyl methacrylate and acrylic esters having a long-chain ethylene oxide chain as their side chains, hydrophobic monomers such as styrene monomers, and water-soluble monomers soluble in water at a pH of about 7, such as acrylamides, vinyl ethers, vinylpyrrolidones, vinylpyridines and vinyloxazolidines. As the hydrophobic monomers, are used hydrophobic monomers such as styrene, styrene derivatives, vinylnaphthalene, vinylnaphthalene derivatives, (meth)acrylic acid alkyl esters and acrylonitrile. It is preferable that in the high-molecular dispersing agent obtained by the copolymerization, the water-soluble monomer be used in a range of from 15 to 35% by weight for the purpose of causing the copolymer to stably be present in the aqueous solution, and the hydrophobic monomer be used in a range of from 20 to 40% by weight for the purpose of enhancing the dispersing effect of the copolymer on the pigment.

In addition to the above-described ultrafinely particulate pigment and dispersing agent for pigment, the inks used in the present invention may contain water, water-soluble organic solvents and other components, for example, viscosity modifiers, pH adjustors, antiseptics, surfactants, antioxidants, anti-curling agent as needed.

As the surfactants, may be used cationic surfactants, such as compounds of the primary, secondary and tertiary amine salt types, specifically, the hydrochlorides, acetates and the like of laurylamine, coconut amine, stearylamine, rosin amine and the like; compounds of the quaternary ammonium salt type, specifically, lauryltrimethylammonium chloride, cetyltrimethylammonium chloride, benzyltributylammonium chloride, benzalkonium chloride and the like; pyridinium salt type compounds, specifically, cetylpyridinium chloride, cetylpyridinium bromide and the like; imidazoline type cationic compounds, specifically, 2-heptadecenylhydroxyethylimidazoline and the like; and ethylene oxide adducts of higher alkylamines, specifically, dihydroxyethylstearylamine and the like; and amphoteric surfactants exhibiting a cationic nature in a certain pH region. Specific examples thereof include carboxylic acid type amphoteric surfactants such as amino acid type amphoteric surfactants, compounds of the R—NH—$CH_2$—$CH_2$—COOH type, betaine type compounds, specifically, stearyldimethylbetaine, lauryldihydroxy-ethylbetaine and the like; and besides amphoteric surfactants of the sulfuric ester type, sulfonic acid type, phosphoric ester type and the like. Examples of nonionic surfactants include nonionic surfactants such as polyoxyethylene alkyl ethers, polyoxyethylene alkyl esters, acetylene alcohols and acetylene glycols. In the present invention, one or more of these surfactants may be suitably chosen for use. Among the above surfactants, acetylene alcohols and acetylene glycols are preferably used because these surfactants can improve the penetrability of the liquid composition into plain paper, and on one hand inhibit foaming of the liquid composition is inhibited and can quickly eliminate foams if foamed. The amount of the surfactant used varies according to the kind of the surfactant used, but is desirably within a range of from 0.05 to 5% by mass based on the total mass of the ink because sufficient penetrability can be ensured.

The cationic inks used in the present invention may desirably be controlled so as to have, as their own physical properties at 25° C., a surface tension of preferably at least 10 mN/m (dyn/cm), more preferably not lower than 20 mN/m (dyn/cm), but not higher than 70 mN/m (dyn/cm), further preferably within a range of from 30 to 68 mN/m (dyn/cm) from the viewpoints of improving the penetrability of the inks in printed images when printed on plain paper or the like, and at the same time making the matching of the inks with an ink-jet head good. The viscosity is preferably adjusted to 15 mPa·s (cP) or lower, particularly 10 mPa·s (cP) or lower, more preferably 5 mPa·s (cP) or lower.

<Liquid Composition>

The liquid composition will hereinafter be described.

The liquid composition according to the present invention comprises fine particles and a solvent.

<Pore Radius and Pore Volume>

When physical properties (pore radius and pore volume) of fine particle aggregates obtained from the liquid composition are determined, a pretreatment is performed in accordance with the following procedures.

(1) The liquid composition is dried at 120° C. for 10 hours under atmospheric conditions to almost evaporate a solvent component.

(2) The dried product is heated from 120° C. to 700° C. over 1 hour, and then calcined for 3 hours at 700° C.

(3) After the calcination, the calcined product is gradually cooled to ordinary temperature and ground into powder.

The reason why the pretreatment is performed is that fine particle aggregates are formed from the liquid composition by the drying, and the solvent component is completely removed by the calcination to empty pores in the aggregates, thereby forming voids.

As a measuring method of the pore radius and pore volume used in the present invention, a nitrogen adsorption and desorption method may be preferably used. The size of pores in the fine particle aggregates as a target for the measurement in the present invention is a pore volume of pores having a pore radium within a range of from 3 to 30 nm. The reason why the pore volume within this range has very high correlation with the image forming ability is not clearly known. However, it is considered that pores having a pore radium within this range substantially contribute to improvement in coloring because the penetrability of the coloring material and solvent component into the fine particle aggregates becomes high, adsorption of the coloring material attributable to the pores is increased, and the coloring material is hard to be affected by light scattering of the pore itself.

In order to take the coloring material in an amount sufficient to contribute to the improvement in coloring in the interiors of the aggregates, the pore radius is required to be 3 to 30 nm, and at the same time a certain volume is also required. It is also considered that the number of pores in the fine particle aggregates is increased as the pore volume is increased and that not only the adsorption of the coloring material into the interiors of the pores, but also the adsorption in the vicinity of the entrances of the pores is increased.

From these points in view, it is considered that in the liquid composition preferably used in the present invention, a pore volume in a pore radius range of from 3 to 30 nm is preferably at least 0.4 ml/g, and a pore volume in a pore radius range exceeding 30 nm is preferably at most 0.1 ml/g.

Accordingly, the measurement of the pore volumes in both pore radius range of from 3 to 30 nm and pore radius range exceeding 30 nm is effective for the determination of coloring performance of images formed. As a measuring method of the physical properties of pores in these ranges, a method in accordance with the nitrogen adsorption and desorption method is optimum. The pore radius and pore volume can be found from the method (J. Am. Chem. Soc., Vol. 73, 373, 1951) of Barrett et al. in accordance with the nitrogen adsorption and desorption method.

(Fine Particles)

The actions required of the fine particles contained in the liquid composition include, for example, 1) adsorbing a coloring material without impairing the coloring ability inherent in the coloring material when mixed with an ink; and
2) lowering its dispersion stability when mixed with an ink or applied to a recording medium, so as to remain on the surface of the recording medium.

These actions may be achieved by one kind or two or more kinds of fine particles.

As a nature for meeting the action 1), is mentioned, for example, to exhibit an ionicity opposite to a coloring material used. By this nature, the fine particles can electrostatically adsorb the coloring material. When the coloring material is anionic, cationic fine particles are used, while anionic fine particles are used when the coloring material is cationic. As factors for adsorbing the coloring material, besides the ionicity, are mentioned the size and weight of the fine particles, and the surface profile thereof. For example, porous fine particles having many pores in the surfaces thereof exhibit specific adsorption characteristics and can adsorb the coloring material by virtue of a plurality of factors such as size and shape of the pores.

The action 2) is caused by an interaction between an ink and a recording medium. Therefore, the action may be achieved by respective constitutions thereof. For example, as a nature of the fine particles, is mentioned to exhibit an ionicity opposite to the components of the ink and recording material. The dispersion stability of the fine particles is also affected by causing an electrolyte to coexist in the ink or liquid composition. In the present invention, it is desirable to achieve any one of the actions 1) and 2) in a moment. It is further preferable to achieve both actions 1) and 2) in a moment. Liquid compositions containing the respective ionic fine particles will hereinafter be described specifically.

<Cationic Liquid Composition>

An example of a cationic liquid composition include a liquid composition containing fine particles having a cationic group at the surfaces thereof and an acid, wherein the fine particles are stably dispersed. In the present invention, as the liquid composition, may be preferably used that containing an acid and adjusted to pH 2 to 7 or that having a zeta potential of +5 to +90 mV.

(pH and Zeta Potential)

The zeta potential of the liquid composition will be discussed. The basic principle of the zeta potential will hereinafter be described. When a free charge is present on the surface of a solid phase in a system that a solid is dispersed in a liquid, a charged layer of an opposite charge appears in a liquid phase in the vicinity of an interface with the solid phase so as to retain electrical neutrality. This is called an electrical double layer, and a potential difference by this electrical double layer is referred to as a zeta potential. When the zeta potential is plus, the surfaces of the fine particles exhibit a cationic nature, but exhibit an anionic nature when minus. In general, electrostatic repulsive force acting between fine particles becomes stronger as the absolute value thereof is higher, and such fine particles are said to be good in dispersibility. It is considered that at the same time, the ionicity on the surfaces of the fine particles is strong. More specifically, the cationic nature becomes stronger as the zeta potential of the cationic fine particles is higher. In the present invention, when a liquid composition containing such fine particles is brought into contact with an anionic aqueous ink in a liquid—liquid state on a recording medium, it is said that the force to attract an anionic compound in the ink is strong.

As a result of an extensive investigation by the present inventors, it has been found that when a liquid composition the zeta potential of which falls within a range from +5 to +90 mV is used, a recorded image formed on a recording medium exhibits particularly excellent coloring properties. The reason for it is not clearly known. However, it is perhaps considered that the anionic compound is adsorbed thinly and evenly on the surfaces of the fine particles without causing rapid aggregation of the anionic compound because the cationic nature exhibited by the surfaces of the fine particles is moderate, and so the coloring material is hard to form great lake, and consequently the coloring ability inherent in the coloring material is developed in a better state. In addition, in the cationic liquid composition of the present invention, the dispersed state of the fine particles becomes unstable while exhibiting a weak cationic nature even when the anionic compound is adsorbed on the surfaces of the fine particles, whereby the fine particles are easily adsorbed on the surfaces of anionic cellulose fibers and the like present in the recording medium while the fine particles are aggregating, and so the fine particles are easy to remain in the vicinity of the surface of the recording medium.

As a result, it is considered that such excellent effects as mentioned below are brought about. Namely, the same excellent coloring properties as in coated paper are achieved, and the formation of an image little in whitish haze and color irregularity and excellent in color evenness is feasible even in an image region great in the quantity of an ink applied, such as a shadow portion or solid print portion. In addition, since the anionic compound is adsorbed on the fine particles extremely efficiently compared with coated paper to develop a color, the quantity of the cationic fine particles applied can be lessened, and so the hand of paper is not impaired when printing is conducted on plain paper in particular, and the rub-off resistance of a printed area become excellent.

With respect to more preferable zeta potential ranges, for example, when a liquid composition containing cationic fine particles the zeta potential of which falls within a range of from +10 to +85 mV is used, boundaries between dots upon solid printing are hard to be conspicuous to permit the achievement of more reduction in stripe irregularity by head scan. When a liquid composition containing cationic fine particles the zeta potential of which falls within a range of from +15 to +65 mV is used, an image having extremely excellent coloring property can be provided irrespective of the kind of paper.

The pH of the cationic liquid composition according to the present invention preferably falls within a range of from 2 to 7 at about 25° C. from the viewpoints of the shelf stability of the liquid composition and the adsorbing ability of the anionic compound contained in the aqueous ink on the surfaces of the cationic fine particles. Since the stability of the anionic compound is not markedly lowered when the liquid composition is mixed with the anionic ink at a pH within this range, no strong aggregation of the anionic compound itself is caused, and so it can be effectively prevented to lower the saturation of a recorded image or form a dull image.

Since the dispersed state of the fine particles is also good within the above range, the shelf stability and ejection stability from a recording head of the liquid composition can be well retained. In addition, since the anionic substance in the ink is sufficiently adsorbed on the surfaces of the cationic fine particles when mixed with the ink, excess penetration of the coloring material into the interior of a recording medium is prevented, whereby an ink-jet recorded article having excellent coloring property can be provided. A more preferable pH range is from 3 to 6. When the pH falls within this range, corrosion of a recording head due to long-term storage is extremely effectively prevented, and moreover the rub-off resistance of a printed area is still more improved.

(Cationic Fine Particles)

Components making up the cationic liquid composition according to the present invention will now be described. The cationic fine particles as a first component are required to exhibit a cationic nature at their surfaces in a state dispersed in the liquid composition in order to achieve the above-described actions and effects. By making the surfaces of the fine particles cationic, an anionic coloring material is quickly adsorbed on the surfaces thereof when mixed with an anionic ink, and so excess penetration of the coloring material into the interior of a recording medium is prevented, resulting in the provision of an ink-jet recorded article having sufficient optical density of image.

When the surfaces of fine particles do not exhibit a cationic nature, but fine particles and a water-soluble cationic compound are separately present in the liquid composition on the other hand, aggregation of a coloring material occurs around the cationic compound, and so the coloring properties of the coloring material itself are impaired. Therefore, it is difficult to achieve the same coloring property as in coated paper. Therefore, the fine particles used in the liquid composition according to the present invention must be cationic at the surfaces thereof. However, even fine particles which are electrostatically anionic or neutral by nature may be used so far as their surfaces have been cationized by a treatment, to say nothing of naturally cationic fine particles.

No particular limitation is imposed on the kind of a material for the cationic fine particles preferably used in the present invention, and specific examples thereof include inorganic fine particles, organic fine particles, and inorganic and organic combined fine particles. Examples of the inorganic fine particles include cationized fine particles of silica, alumina, alumina hydrate, titania, zirconia, boria, silicaboria, ceria, magnesia, silicamagnesia, calcium carbonate, magnesium carbonate, zinc oxide and hydrotalcite. Examples of the organic fine particles include cationic emulsions and latexes of styrene-acrylic acid or acrylic ester copolymers, methacrylic ester copolymers, conjugated diene copolymers such as SBR latexes, and vinyl copolymers such as ethylene-vinyl acetate copolymers, and cationically modified products of melamine beads, plastic pigments and the like. Examples of the inorganic and organic combined fine particles include inorganic fine particles having a primary, secondary or tertiary amine type functional group at their surfaces. These may be used either singly or in any combination thereof.

In particular, the use of alumina hydrate as the fine particles is preferred because it has a positive charge at the surfaces of its particles. Among others, alumina hydrate showing a boehmite structure when analyzed by the X-ray diffractiometry is preferred from the viewpoints of excellent coloring ability, color evenness, shelf stability, etc. The alumina hydrate is defined by the following general formula:

$$Al_2O_{3-n}(OH)_{2n} \cdot mH_2O$$

wherein n is an integer of 0 to 3, and m is a value of 0 to 10, preferably 0 to 5. In many cases, $mH_2O$ represents an aqueous phase which does not participate in the formation of a crystal lattice, but is able to be removed. Therefore, m may take a value other than an integer. However, m and n are not 0 at the same time.

A crystal of the alumina hydrate showing a boehmite structure is generally a layer compound the (020) plane of which forms a macro-plane, and shows a characteristic diffraction peak on an X-ray diffraction pattern. Besides the perfect boehmite, a structure called pseudoboehmite and containing excess water between layers of the (020) plane may be taken. The X-ray diffraction pattern of this pseudoboehmite shows a diffraction peak broader than that of the perfect boehmite.

Since the perfect boehmite and pseudoboehmite may not be clearly distinguished from each other, alumina hydrates including both are called the alumina hydrate showing a boehmite structure (hereinafter referred to as the alumina hydrate) in the present invention unless expressly noted. The interplanar spacing of the (020) plane and the crystal thickness at the (020) plane can be found by measuring a peak which appears at a diffraction angle 2θ of 14 to 15° and using the Bragg's formula for the interplanar spacing and the Scherrer's formula for the crystal thickness from a diffraction angle 2θ at the peak and a half breadth B of the peak. The interplanar spacing of the (020) plane is used as an index to the hydrophilicity/hydrophobicity of the alumina hydrate. No particular limitation is imposed on the production process of the alumina hydrate used in the present invention so far as it is a process capable of producing an alumina hydrate having a boehmite structure. For example, the alumina hydrate can be produced by a method such as the hydrolysis of an aluminum alkoxide or sodium aluminate.

As disclosed in Japanese Patent Application Laid-Open No. 56-120508, an alumina hydrate having an amorphous form from the viewpoint of X-ray diffractometry may be heat-treated at 50° C. or higher in the presence of water to convert it to a boehmite structure before its use. A process, which can be particularly preferably used in the present invention, is a process in which an acid is added to a long-chain aluminum alkoxide to hydrolyze and defloculate the alkoxide, thereby obtaining an alumina hydrate. The term "long-chain aluminum alkoxide" as used herein means an alkoxide having, for example, 5 or more carbon atoms. Further, the use of an alkoxide having 12 to 22 carbon atoms is preferred because the removal of alcohol formed and the shape control of the alumina hydrate can be conducted with ease as described below.

As the acid to be added, one or more acids may be freely selected from organic and inorganic acids. However, nitric acid is most preferable from the viewpoint of the reaction efficiency of the hydrolysis, and the shape control and dispersibility of the resulting alumina hydrate. It is also possible to conduct a hydrothermal synthesis or the like after this process so as to control the particle size of the alumina hydrate. When the hydrothermal synthesis is conducted using an alumina hydrate dispersion containing nitric acid, the nitric acid in the aqueous solution can be introduced in the form of a nitrate group into the surface of the alumina hydrate, thereby improving the dispersibility in water of the alumina hydrate. After the hydrothermal synthesis, an acid is suitably added to the slurry of the alumina hydrate to adjust the pH, and the slurry is concentrated, whereby an extremely stable alumina hydrate slurry of high solids concentration can be prepared with a small amount of the acid. When such a slurry is used, a liquid composition excellent in dispersion stability of the fine alumina hydrate particles can be prepared without need of separately adding an acid, which will be described subsequently.

The process by the hydrolysis of the aluminum alkoxide has an advantage that impurities such as various ions are hard to get mixed as compared with the process for producing alumina hydrogel or cationic alumina. The use of the long-chain aluminum alkoxide also has an advantage that since the long-chain alcohol formed is easy to remove after the hydrolysis, the removal of the alcohol from the alumina hydrate can be completely conducted as compared with the case where a short-chain alkoxide such as aluminum isopropoxide is used. In this process, it is preferable to preset the pH of a solution to 6 or lower upon the initiation of the hydrolysis. Any pH higher than 8 is not preferable because the alumina hydrate to be finally obtained will become crystalline.

As the alumina hydrate used in the present invention, alumina hydrate containing a metal oxide such as titanium dioxide may be employed so far as it shows a boehmite structure when analyzed by the X-ray diffractometry. The content of the metal oxide such as titanium dioxide is preferably within a range of from 0.01 to 1.00% by weight based on the alumina hydrate because an optical density becomes high. It is more preferable to contain titanium dioxide in a proportion ranging from 0.13 to 1.00% by weight because the adsorbing rate of the coloring material becomes high, so that feathering and beading become difficult to occur. Further, the valence of titanium in the titanium dioxide must be +4. The content of titanium dioxide in the alumina hydrate can be determined by fusing an alumina hydrate sample in boric acid in accordance with the ICP method. The distribution of titanium dioxide in the alumina hydrate and the valence of titanium in the titanium dioxide can be analyzed by means of an ESCA.

The surface of an alumina hydrate sample is etched with an argon ion for 100 seconds and 500 seconds to determine changes in content of titanium dioxide. If the valence of titanium in titanium dioxide becomes lower than +4, the titanium dioxide comes to serve as a catalyst, so that the weather resistance of the resulting printed article is lowered, and yellowing of the printed article may be easy to occur in some cases.

The alumina hydrate may contain titanium dioxide either only in the vicinity of the surface of the alumina hydrate or up to the interior thereof. Its content may be changed from the surface to the interior. Titanium dioxide may preferably be contained only in the close vicinity of the surface of the alumina hydrate because the electrical properties of the alumina hydrate are easy to be kept.

As a process for producing the titanium dioxide-containing alumina hydrate, a process as described in Gakkai Shuppan Center, "Science of Surfaces", edited by Kenji Tamaru, p. 327 (1985), in which a liquid mixture of an aluminum alkoxide and a titanium alkoxide is hydrolyzed, is preferred. As another process, its production may also be conducted by adding an alumina hydrate as a nucleus for crystal growth upon the hydrolysis of the mixture of the aluminum alkoxide and the titanium alkoxide.

Oxides of silicon, magnesium, calcium, strontium, barium, zinc, boron, germanium, tin, lead, zirconium, indium, phosphorus, vanadium, niobium, tantalum, chromium, molybdenum, tungsten, manganese, iron, cobalt, nickel, ruthenium and the like may be used instead of titanium dioxide. For example, silica-containing alumina hydrate is effective for improving the rub-off resistance of the resulting printed article.

The interplanar spacing of the (020) plane of the alumina hydrate preferably used in the present invention is preferably within a range of from 0.614 to 0.620 nm. When the interplanar spacing falls within this range, the dispersion stability of the alumina hydrate particles in the liquid composition becomes good, thereby providing a liquid composition excellent in shelf stability and ejection stability. The reason for it is not clearly known. However, it is considered that when the interplanar spacing of the (020) plane falls within this range, the proportion between the hydrophilicity and the hydrophobicity of the alumina hydrate falls within an optimum range, and so a balance between dispersion stability and wetting in the interior of an ejection orifice is made moderate due to moderate repulsion between the particles in the liquid composition, whereby the ejection stability is improved.

The crystal thickness at the (020) plane of the alumina hydrate is preferably within a range of from 4.0 to 10.0 nm because transparency and adsorbing ability of the coloring material become excellent. According to a finding of the present inventors, the interplanar spacing of the (020) plane correlates to the crystal thickness at the (020) plane, so that the crystal thickness at the (020) plane can be controlled within the range of from 4.0 to 10.0 nm when the interplanar spacing of the (020) plane falls within the above range.

Alumina (aluminum oxide) formed by subjecting the above-described alumina hydrate, metal aluminum, aluminum salt or the like to a heat treatment such as calcination may be preferably used because it also has a positive charge. Alumina includes those having a crystal state of the $\alpha$, $\gamma$, $\delta$, χ, η, ρ or β type. Any of them may be used so far as it is stably dispersed in water in the form that its surface is cationically retained. Among these, the γ type may be preferably used because its surface is active, and it is high in adsorptivity of coloring materials and comparatively easy to form a stable fine particle dispersion, and so it is excellent in coloring ability, shelf stability and ejection stability.

Such cationic fine particles as described above used in the present invention preferably have an average particle diameter within a range of from 0.005 to 1 μm as determined by a dynamic light scattering method from the viewpoints of coloring ability and color evenness after printing, shelf stability, etc. The average particle diameter within this range can effectively prevent excess penetration of the fine particles into the interior of a recording medium to prevent the lowering of coloring ability and color evenness. It is also prevented for the cationic fine particles to precipitate in the liquid composition, whereby the lowering of shelf stability of the liquid composition can be effectively prevented. The average particle diameter is more preferably within a range of from 0.01 to 0.8 μm. When such fine particles are used, the rub-off resistance of an image formed after printing on a recording medium and the texture of the resulting recorded article become particularly preferable.

The average particle diameter is still more preferably within a range of from 0.03 to 0.3 μm. Such fine particles are preferred because pores in fine particle aggregates formed on a recording medium are easy to be effectively formed in the intended pore radius range.

(Physical Properties and Shape of Pores in Cationic Fine Particles)

Such cationic fine particles as described above used in the present invention are preferably such that the peak pore radius of the fine particles is within a range of from 2 to 12 nm as measured by the nitrogen adsorption and desorption method, and the total pore volume is at least 0.3 ml/g from the viewpoint of efficiently forming pores in fine particle aggregates to be formed on a recording medium and at the same time efficiently adsorbing a coloring material on the surfaces of the fine particles themselves. It is more preferable that the peak pore radius of the fine particles is within a range of from 3 to 10 nm, and the total pore volume is at least 0.3 ml/g, since pores in fine particle aggregates formed on a recording medium are easy to be effectively formed in the intended pore radius range.

When the BET specific surface area of the fine particles used in the present invention falls within a range of from 70 to 300 m$^2$/g, a coloring material is easy to be more efficiently left in the vicinity of the surface of a recording medium because adsorbing points of the coloring material on the surfaces of the fine particles are sufficiently present, which contributes to improvement in coloring ability.

The shape of the fine particles used in the present invention can be determined by dispersing the fine particles in ion-exchanged water, dropping the resultant dispersion on a collodion membrane to prepare a sample for measurement and observing this sample through a transmission electron microscope. In the present invention, fine particles in a non-spherical form such as a needle or a flat plate, or a rod or necklace in which spherical primary particles are linked with a directional property to form secondary particles may be preferably used in that pores are formed in aggregates of the fine particles when the aggregates are formed on a recording medium.

According to the finding of the present inventors, fine particles in the flat plate form have better dispersibility in water than those of the needle form or bundle form (the ciliary form), and the orientation of fine particles becomes random when forming aggregates of the fine particles, so that the pore volume increases. Such fine particles are hence more preferred. The bundle form as used herein refers to the state that fine particles in the form of a needle aggregate like a hair bundle with their sides in contact. As described in literature [Rocek J., et al., Applied Catalysis, Vol. 74, pp. 29–36 (1991)], it is generally known that pseudoboehmite among alumina hydrates preferably used in the present invention has both needle form (the ciliary form) and another form.

The aspect ratio of particles in the form of a flat plate can be determined in accordance with the method defined in Japanese Patent Publication No. 5-16015. The aspect ratio is expressed by a ratio of "diameter" to "thickness" of a particle. The term "diameter" as used herein means a diameter of a circle having an area equal to a projected area of the particle, which has been obtained by observing the alumina hydrate through a microscope or electron microscope. A slenderness ratio is expressed by a ratio of a minimum diameter to a maximum diameter of the flat plate surface when observed in the same manner as in the aspect ratio. In the case of the bundle form, the aspect ratio can be determined by regarding the individual needle particles of the alumina hydrate, from which a bundle is formed, as a cylinder, and finding diameters of upper and lower circles and a length of the cylinder to use a ratio of the length to the diameter.

The most preferable shape of the alumina hydrate is such that in the form of a flat plate, the average aspect ratio is within a range of from 3 to 10, and in the case of the bundle form, the average aspect ratio be within a range of from 3 to 10. When the average aspect ratio falls within the above range, a porous structure can be formed with ease because voids are defined between particles when the aggregates of the fine particles are formed.

The content of the cationic fine particles in the liquid composition according to the present invention may be suitably determined within an optimum range according to the kinds of substances used. However, it is preferably within a range of from 0.1 to 40% by mass, more preferably from 1 to 30% by mass, most preferably from 3 to 15% by mass from the viewpoint of achieving the objects of the present invention. The content is controlled within this range, whereby an image excellent in coloring can be stably provided irrespective of the kind of paper used. In addition, the shelf stability and ejection stability of the liquid composition also become excellent.

(Acid)

As described above, the cationic liquid composition according to the present invention preferably contains an acid and is adjusted to pH 2 to 7. This acid as a second component plays a role of ionizing the surfaces of the cationic fine particles to enhance surface potential, thereby enhancing the dispersion stability of the fine particles in a liquid, and moreover enhancing the adsorbing ability of an anionic compound in an ink and adjusting the viscosity of the liquid composition. No particular limitation is imposed on the acid suitably used in the present invention so far as it can achieve the desired pH and zeta potential, and physical properties such as dispersibility of the fine particles, and may be freely selected for use from among inorganic acids and organic acids mentioned below, and the like.

Specific examples of the inorganic acids include hydrochloric acid, sulfuric acid, sulfurous acid, nitric acid, nitrous acid, phosphoric acid, boric acid and carbonic acid. Examples of the organic acids include such carboxylic acids, sulfonic acids and amino acids as mentioned below, and the like.

Examples of the carboxylic acids include formic acid, acetic acid, chloroacetic acid, dichloroacetic acid, trichloroacetic acid, fluoroacetic acid, trimethylacetic acid, methoxyacetic acid, mercaptoacetic acid, glycolic acid, propionic acid, butyric acid, valeric acid, caproic acid, caprylic acid, capric acid, lauric acid, myristic acid, palmitic acid, stearic acid, oleic acid, linolic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, malonic acid, succinic acid, glutaric acid, adipic acid, tartaric acid, maleic acid, fumaric acid, citric acid, phthalic acid, isophthalic acid, terephthalic acid, salicylic acid, p-hydroxybenzoic acid, anthranilic acid, m-aminobenzoic acid, p-aminobenzoic acid, o-methoxybenzoic acid, m-methoxybenzoic acid and p-methoxybenzoic acid.

Examples of the sulfonic acids include benzenesulfonic acid, methylbenzenesulfonic acid, ethylbenzenesulfonic acid, dodecylbenzenesulfonic acid, 2,4,6-trimethylbenzenesulfonic acid, 2,4-dimethylbenzenesulfonic acid, 5-sulfosalicylic acid, 1-sulfonaphthalene, 2-sulfonaphthalene, hexanesulfonic acid, octanesulfonic acid and dodecanesulfonic acid. Examples of the amino acids include glycine, alanine, valine, α-aminobutyric acid, γ-aminobutyric acid, β-alanine, taurine, serine, α-amino-n-caproic acid, leucine, norleucine and phenylalanine.

These may be used either singly or in any combination thereof in the cationic liquid composition according to the present invention. Among these, acids having a primary dissociation constant pka of at most 5 in water may be particularly preferably used because they can make the dispersion stability of cationic fine particles and the adsorbing ability of anionic compounds excellent. Specific examples thereof include hydrochloric acid, nitric acid, sulfuric acid, phosphoric acid, acetic acid, formic acid, oxalic acid, lactic acid, maleic acid and malonic acid.

In the cationic liquid composition according to the present invention, a mixing ratio (A:B) of the cationic fine particles (A) to the acid (B) in the liquid composition is preferably controlled within a range of from 200:1 to 5:1, more preferably from 150:1 to 8:1 in terms of a mass ratio from the viewpoint of improving the dispersion stability of the cationic fine particles and the adsorbing ability of the anionic compound (ultrafinely particulate pigment) on the surfaces of the fine particles.

(Other Components)

Other components constituting the cationic liquid composition will now be described specifically. The cationic liquid composition according to the present invention comprises the fine particles as an essential component, and preferably contains such an acid as described above and generally water as a liquid medium. However, the liquid composition may further contain a water-soluble organic solvent as a liquid medium and optionally other additives.

Examples of the water-soluble organic solvent used herein include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, thiodiglycol, hexylene glycol and diethylene glycol; lower alkyl ethers of polyhydric alcohols, such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; and besides, 1,2,6-hexanetriol, glycerol, N-methyl-2-pyrrolidone, 1,3-dimethylimidazolidinone, triethanolamine, sulfolane and dimethyl sulfoxide. Examples of humectants include nitrogen-containing compounds such as urea, thiourea, ethyleneurea, alkylurea, alkylthiourea, dialkylurea and dialkylurea, and saccharides such as glucitol, mannitol and inositol. No particular limitation is imposed on the content of the water-soluble organic solvent and humectant. However, it is preferably within a range of, for example, from 5 to 60% by mass, more preferably from 5 to 40% by mass based on the total weight of the liquid composition.

Besides the above components, additives such as viscosity modifiers, pH adjustors, antiseptics, various surfactants, antioxidants, evaporation accelerators, water-soluble cationic compounds and binder resins may be suitably incorporated into the cationic liquid composition according to the present invention as needed. The selection of the surfactants is particularly important from the viewpoint of controlling the penetrability of the liquid composition into a recording medium. The water-soluble cationic compounds may be freely selected for use within limits not impeding the actions and effects of the present invention for the purpose of, for example, imparting additional cationic nature to the liquid composition. As the surfactants, may be used cationic surfactants, such as compounds of the primary, secondary and tertiary amine salt types, specifically, the hydrochlorides, acetates and the like of laurylamine, coconut amine, stearylamine, rosin amine and the like; compounds of the quaternary ammonium salt type, specifically, lauryltrimethylammonium chloride, cetyltrimethylammonium chloride, benzyltributylammonium chloride, benzalkonium chloride and the like; pyridinium salt type compounds, specifically, cetylpyridinium chloride, cetylpyridinium bromide and the like; imidazoline type cationic compounds, specifically, 2-heptadecenylhydroxyethylimidazoline and the like; and ethylene oxide adducts of higher alkylamines, specifically, dihydroxyethylstearylamine and the like; and amphoteric surfactants exhibiting a cationic nature in a certain pH region. Specific examples of the amphoteric surfactants include carboxylic acid type amphoteric surfactants such as amino acid type amphoteric surfactants, compounds of the R—NH—CH$_2$—CH$_2$—COOH type, betaine type compounds, specifically, stearyldimethylbetaine, lauryldihydroxyethylbetaine and the like; and besides amphoteric surfactants of the sulfuric ester type, sulfonic acid type, phosphoric ester type and the like. Examples of nonionic surfactants include nonionic surfactants such as polyoxyethylene alkyl ethers, polyoxyethylene alkyl esters, acetylene alcohols and acetylene glycols. In the present invention, one or more of these surfactants may be suitable chosen for use. Among the above surfactants, acetylene alcohols and acetylene glycols are preferably used because these surfactants can improve the penetrability of the liquid composition into plain paper, and on one hand inhibit foaming of the liquid composition is inhibited and can quickly eliminate foams if foamed.

The amount of the surfactant used varies according to the kind of the surfactant used, but is desirably within a range of from 0.05 to 5% by mass based on the total weight of the ink because sufficient penetrability can be ensured.

The binder resins may be used in combination within limits not impeding the texture of a recording medium used and the shelf stability and ejection stability of the liquid composition for the purpose of, for example, further improving the rub-off resistance of the cationic fine particles, and may be freely selected for use from among, for example, water-soluble polymers such as polyvinyl alcohol, gelatin, polyvinyl pyrrolidone, polyethylene oxide, casein, starch and carboxymethyl cellulose; emulsions of polyacrylic acid, polyurethane and polyvinyl acetate and copolymers thereof; latexes such as SBR and NBR; etc.

The cationic liquid composition according to the present invention is preferable colorless or white, but may be toned according to the color of a recording medium used. With respect to preferable physical property ranges of such a liquid composition as described above, the surface tension is within a range of from 10 to 60 mN/m (dye/cm), preferably 10 to 40 mN/m (dye/cm), and the viscosity is within a range of from 1 to 30 mPa·s (cP).

<Anionic Liquid Composition>

The anionic liquid composition according to the present invention comprises fine particles having an anionic group at the surfaces thereof as an essential component and is characterized in that the fine particles are stable dispersed. Further, a liquid composition containing an acid and adjusted to pH 7 to 12 or that having a zeta potential of −5 to −90 mV is preferred.

(pH and Zeta Potential)

As a result of an extensive investigation by the present inventors, it has been found that when a liquid composition the zeta potential of which falls within a range from −5 to −90 mV is used, a cationic compound (cationic coloring material) in an ink is particularly efficiently adsorbed on the surfaces of the anionic fine particles to exhibit particularly excellent coloring properties. The reason for it is not clearly known. However, it is perhaps considered like the case of the cationic liquid composition previously described that the cationic compound is adsorbed thinly and evenly on the surfaces of the fine particles without causing rapid aggregation of the cationic compound in the ink because the anionic nature exhibited by the surfaces of the fine particles is moderate, and so the coloring material is hard to form great lake, and consequently the coloring ability inherent in the coloring material is developed with better results. In addition, in the anionic liquid composition of the present invention, the dispersed state of the fine particles becomes unstable after the cationic compound is adsorbed on the surfaces of the fine particles, whereby the fine particles aggregate due to concentration changes upon penetration of a solvent component on the recording medium, and so the fine particles are easy to remain in the vicinity of the surface of the recording medium.

As a result, it is considered that such excellent effects as mentioned below are brought about. Namely, the same excellent coloring properties as in coated paper are achieved, and the formation of an image little in whitish haze and color irregularity and excellent in color evenness is feasible even in an image region great in the quantity of an ink applied, such as a shadow portion or solid print portion. In addition, since the cationic compound is adsorbed on the fine particles extremely efficiently compared with coated paper to develop a color, the quantity of the anionic fine particles applied can be lessened, and so the hand of paper is retained when printing is conducted on plain paper in particular, and the rub-off resistance of a printed area become excellent. With respect to more preferable zeta potential ranges, for example, when a liquid composition containing anionic fine particles the zeta potential of which falls within a range of from −10 to −85 mV is used, boundaries between dots upon solid printing are hard to be conspicuous to permit the achievement of more reduction in stripe irregularity by head scan. When a liquid composition containing anionic fine particles the zeta potential of which falls within a range of from −15 to −65 mV is used, an image having extremely excellent coloring property can be provided irrespective of the kind of paper.

The pH of the anionic liquid composition according to the present invention preferably falls within a range of from 7 to 12 at about 25° C. from the viewpoints of the shelf stability of the liquid composition and the adsorbing ability of the cationic compound on the surfaces of the anionic fine particles. Since the stability of the cationic compound is not markedly lowered when the liquid composition is mixed with the cationic ink at a pH within this range, no strong aggregation of the cationic compound itself is caused, and so it can be effectively prevented to lower the saturation of a recorded image or form a dull image. Since the dispersibility of the anionic fine particles is also good when the pH falls within the above range, the shelf stability and ejection stability from a recording head of the liquid composition can be well retained. In addition, since the cationic substance in an ink is sufficiently adsorbed on the surfaces of the anionic fine particles when mixed with the ink, excess penetration of the coloring material into the interior of a recording medium is prevented, whereby an ink-jet recorded article having excellent coloring property can be provided. A more preferable pH range is from 8 to 11. When the pH falls within this range, corrosion of a recording head due to long-term storage is extremely effectively prevented, and moreover the rub-off resistance of a printed area is still more improved.

(Anionic Fine Particles)

Components making up the anionic liquid composition according to the present invention will now be described. The cationic fine particles as a first component are required to exhibit an anionic nature at their surfaces in a state dispersed in the liquid composition in order to achieve the above-described actions and effects. By making the surfaces of the fine particles anionic, a cationic coloring material is quickly adsorbed on the surfaces thereof when mixed with a cationic ink, and so excess penetration of the coloring material into the interior of a recording medium is prevented, resulting in the provision of an ink-jet recorded article having sufficient optical density of image. When the surfaces of fine particles do not exhibit an anionic nature, but fine particles and a water-soluble anionic compound are separately present in the liquid composition on the other hand, aggregation of a coloring material occurs around the anionic compound, and so the coloring properties of the coloring material itself are impaired. Therefore, it is difficult to achieve the same coloring property as in coated paper. Therefore, the fine particles used in the liquid composition according to the present invention must be cationically charged at the surfaces thereof. However, even fine particles which are electrostatically cationic or neutral by nature may be used so far as their surfaces have been anionized by a treatment, to say nothing of naturally anionic fine particles.

No particular limitation is imposed on the kind of a material for the anionic fine particles preferably used in the present invention so far as pores are formed in aggregates of the fine particles to be formed on a recording medium because such fine particles are sufficient to achieve the objects of the present invention. However, specific examples thereof include anionized fine particles of silica, titania, zirconia, boria, silicaboria, ceria, magnesia, silicamagnesia, calcium carbonate, magnesium carbonate and zinc oxide, combined fine particles thereof, organic fine particles, and inorganic and organic combined fine particles. In the liquid composition according to the present invention, these fine particles may be used either singly or in any combination thereof.

As with the cationic fine particles described above, the anionic fine particles used in the present invention preferably have an average particle diameter within a range of from 0.005 to 1 µm as determined by a dynamic light scattering method from the viewpoints of coloring ability and color evenness after printing, and shelf stability. The average particle diameter is more preferably within a range of from 0.01 to 0.8 µm. When such fine particles are used, the rub-off resistance of an image formed upon printing on a recording medium and the texture of the resulting recorded article become particularly preferable. The average particle diameter is still more preferably within a range of from 0.03 to 0.3 µm. Such fine particles are preferred because pores in fine particle aggregates formed on a recording medium are easy to be effectively formed in the intended pore radius range.

(Physical Properties and Shape of Pores in Anionic Fine Particles)

As with the preferred physical properties and shape of pores in cationic fine particles, such anionic fine particles as described above used in the present invention are preferably such that the peak pore radius of the fine particles is within a range of from 2 to 12 nm as measured by the nitrogen adsorption and desorption method, and the total pore volume is at least 0.3 ml/g from the viewpoint of efficiently forming pores in fine particle aggregates to be formed on a recording medium and at the same time efficiently adsorbing a coloring material on the surfaces of the fine particles themselves. It is more preferable that the peak pore radius of the fine particles is within a range of from 3 to 10 nm, and the total pore volume is at least 0.3 ml/g, since pores in fine particle aggregates formed on a recording medium are easy to be effectively formed in the intended pore radius range.

When the BET specific surface area of the fine particles used in the present invention falls within a range of from 70 to 300 m$^2$/g, a coloring material is easy to be more efficiently left in the vicinity of the surface of a recording medium because adsorbing points of the coloring material on the surfaces of the fine particles are sufficiently present, which contributes to improvement in coloring ability.

The shape of the fine particles used in the present invention can be determined by dispersing the fine particles in ion-exchanged water, dropping the resultant dispersion on a collodion membrane to prepare a sample for measurement and observing this sample through a transmission electron microscope. In the present invention, fine particles in a non-spherical form such as a needle or a flat plate, or a rod or necklace in which spherical primary particles are linked with a directional property to form secondary particles may be preferably used in that pores are formed in aggregates of the fine particles when the aggregates are formed on a recording medium. According to a finding of the present inventors, fine particles in the flat plate form have better dispersibility in water than those of the needle form, and the orientation of fine particles becomes random when forming aggregates of the fine particles, so that the pore volume increases. Such fine particles are hence more preferred.

The content of such anionic fine particles as described above may be suitably determined within an optimum range according to the kinds of substances used. However, it is preferably within a range of from 0.1 to 40% by weight, more preferably from 1 to 30% by weight, most preferably from 3 to 15% by weight from the viewpoint of achieving the objects of the present invention. The content is controlled within this range, whereby an image excellent in coloring can be stably provided irrespective of the kind of paper used. In addition, the shelf stability and ejection stability of the liquid composition also become excellent.

(Base)

As described above, the anionic liquid composition according to the present invention preferably contains a base and is adjusted to pH 7 to 12. This base as a second component plays a role of ionizing the surfaces of the anionic fine particles to enhance surface potential, thereby enhancing the dispersion stability of the fine particles in a liquid, and moreover enhancing the adsorbing ability of a cationic compound in an ink and adjusting the viscosity of the liquid composition. No particular limitation is imposed on the base suitably used in the present invention so far as it can achieve the desired pH and zeta potential, and physical properties such as dispersibility of the fine particles, and may be freely selected for use from among inorganic compounds and organic compounds mentioned below, and the like.

Specifically, there may be used, for example, sodium hydroxide, lithium hydroxide, sodium carbonate, ammonium carbonate, ammonia, sodium acetate, ammonium acetate, morpholine, and alkanolamines such as monoethanolamine, diethanolamine, triethanolamine, ethylmonoethanolamine, n-butylmonoethanolamine, dimethylethanolamine, diethylethanolamine, ethyldiethanolamine, n-butyldiethanolamine, di-n-butylethanolamine, monoisopropanolamine, diisopropanolamine and triisopropanolamine. Among these, bases having a primary dissociation constant pkb of at most 5 in water may be particularly preferably used because they can make the dispersion stability of anionic fine particles and the adsorbing ability of cationic compounds (cationic coloring materials) excellent.

In the anionic liquid composition according to the present invention, a mixing ratio (A:B) of the cationic fine particles (A) to the acid (B) in the liquid composition is preferably controlled within a range of from 200:1 to 5:1, more preferably from 150:1 to 8:1 in terms of a weight ratio from the viewpoint of improving the dispersion stability of the anionic fine particles and the adsorbing ability of the cationic compound on the surfaces of the fine particles.

(Other Components)

Other components constituting the anionic liquid composition will now be described specifically. The anionic liquid composition according to the present invention comprises the fine particles as an essential component, and preferably contains such a base as described above and generally water as a liquid medium. However, the liquid composition may further contain a water-soluble organic solvent as a liquid medium and optionally other additives, for example, viscosity modifiers, pH adjustors, antiseptics, various surfactants, antioxidants, evaporation accelerators, water-soluble anionic compounds and binder resins. Examples of the surfactant include anionic surfactants such as fatty acid salts, salts of higher alcohol sulfuric esters, salts of liquid fatty oil sulfuric esters and alkylarylsulfonic acid salts; and nonionic surfactants such as polyoxyethylene alkyl ethers, polyoxyethylene alkyl esters, polyoxyethylene sorbitan alkyl esters, acetylene alcohols and acetylene glycols. In the present invention, one or more of these surfactants may be suitable chosen for use. Among the above surfactants, acetylene alcohols and acetylene glycols are preferably used because these surfactants can improve the penetrability of the liquid composition into plain paper, and on one hand inhibit foaming of the liquid composition is inhibited and can quickly eliminate foams if foamed. The amount of the surfactant used varies according to the kind of the surfactant used, but is desirably within a range of from 0.05 to 5% by mass based on the total weight of the ink because sufficient penetrability can be imparted to the liquid composition.

The anionic liquid composition according to the present invention is preferably colorless or white, but may be toned according to the color of a recording medium used. With respect to preferable physical property ranges of such a liquid composition as described above, the surface tension is within a range of from 10 to 60 mN/m (dye/cm), preferably 10 to 40 mN/m (dye/cm), and the viscosity is within a range of from 1 to 30 Pa·s (cP).

(Preparation Process of Liquid Composition)

As a preparation process of the liquid composition containing the above-described fine particles according to the present invention, any process may be chosen for use from among processes generally used in dispersion. Specifically, a dispersing treatment using a dispersing machine such as roll mill, sand mill, homogenizer, ultrasonic homogenizer or ultrahigh pressure emulsifier (for example, Nanomizer, trade name) for the purpose of controlling the average particle diameter and particle size distribution of fine particles in the liquid composition within the respective ranges described above, and/or a classifying treatment by centrifugation, ultrafiltration or the like is preferably used. The diameter of the fine particles dispersed in the liquid composition can be made even by these treating means.

<Process for Forming Colored Portion on Recording Medium>

The recording process according to the present invention will now be described. The process for forming a recorded image on a recording medium according to the present invention comprises (i) a step of applying the ink described above to the recording medium and (ii) a step of applying the liquid composition described above to the recording medium and is characterized in that the aqueous ink and the liquid composition are applied so as to come into contact with each other in a liquid state on the surface of the recording medium. The process for applying such liquid composition and ink as described above to the recording medium will hereinafter be described.

The recording process according to the present invention comprises a step (ii) of applying such a liquid composition as described above to a recording medium and a step (i) of applying the ink to the recording medium. At that time, the liquid composition is applied to an image-forming region or the image-forming region and the vicinity thereof on the recording medium so as to bring the ink into contact with the liquid composition in a liquid state. The term "image-forming region" as used herein means a region of a recording medium, to which dots of the ink are applied, while the term "the vicinity of the image-forming region" means an outside region about 1 to 5 dots away from the region to which dots of the ink are applied.

In the recording process according to the present invention, the above-described liquid composition and ink may be applied by any method so far as they come into contact with each other in a liquid—liquid state. No problem arises if either of the liquid composition and the ink is first applied to the recording medium. For example, the step (i) may be conducted after the step (ii) is conducted, or the step (ii) may be conducted after the step (i) is conducted. It is also preferred that the step (ii) be conducted after the step (i), and the step (i) be further conducted subsequently thereto. In the case where the liquid composition is first applied to the recording medium, no particular limitation is imposed on the time required from the time the liquid composition is applied to the recording medium up to the time the ink is then applied. However, it is preferable to apply the ink to the recording medium at substantially the same time or within several seconds for the purpose of bringing them into contact with each other in a liquid state.

(Recording Medium)

No particular limitation is imposed on the recording medium used in the recording process described above, and the so-called plain paper such as paper for copying and bond paper, which are routinely used, are preferably used. It goes without saying that coated paper specially prepared for ink-jet recording, and transparent films for OHP may also be preferably used. Besides, general-purpose woodfree paper and glossy paper may also be preferably used.

(Method for Applying the Liquid Composition)

As a method for applying the liquid composition according to the present invention to the recording medium, it is also considered to apply the liquid composition to the whole surface of the recording medium by, for example, a sprayer, roller or the like. However, the application is preferably carried out by an ink-jet system by which the liquid composition can be applied selectively and evenly only to the image-forming region where the ink will be applied, or the image-forming region and the vicinity of the image-forming region. At that time, various kinds of ink-jet recording systems may be used. However, a system in which bubbles generated by thermal energy are used to eject droplets is particularly preferred.

<Ink-Jet Recording Apparatus>

The ink-jet recording apparatus according to the present invention will now be described. The ink-jet recording apparatus according to the present invention comprises a first recording unit equipped with an ink container portion which contains an anionic or cationic aqueous ink containing a coloring material, and an ink-jet head for ejecting the ink, and a second recording unit equipped with a liquid composition container portion which contains the liquid composition according to the present invention, preferably, a liquid composition containing fine particles dispersed therein and electrically charged at the surface in a polarity opposite to the aqueous ink, in a dispersed state, and an ink-jet head for ejecting the liquid composition.

The apparatus will hereinafter be described.

Figure 1:
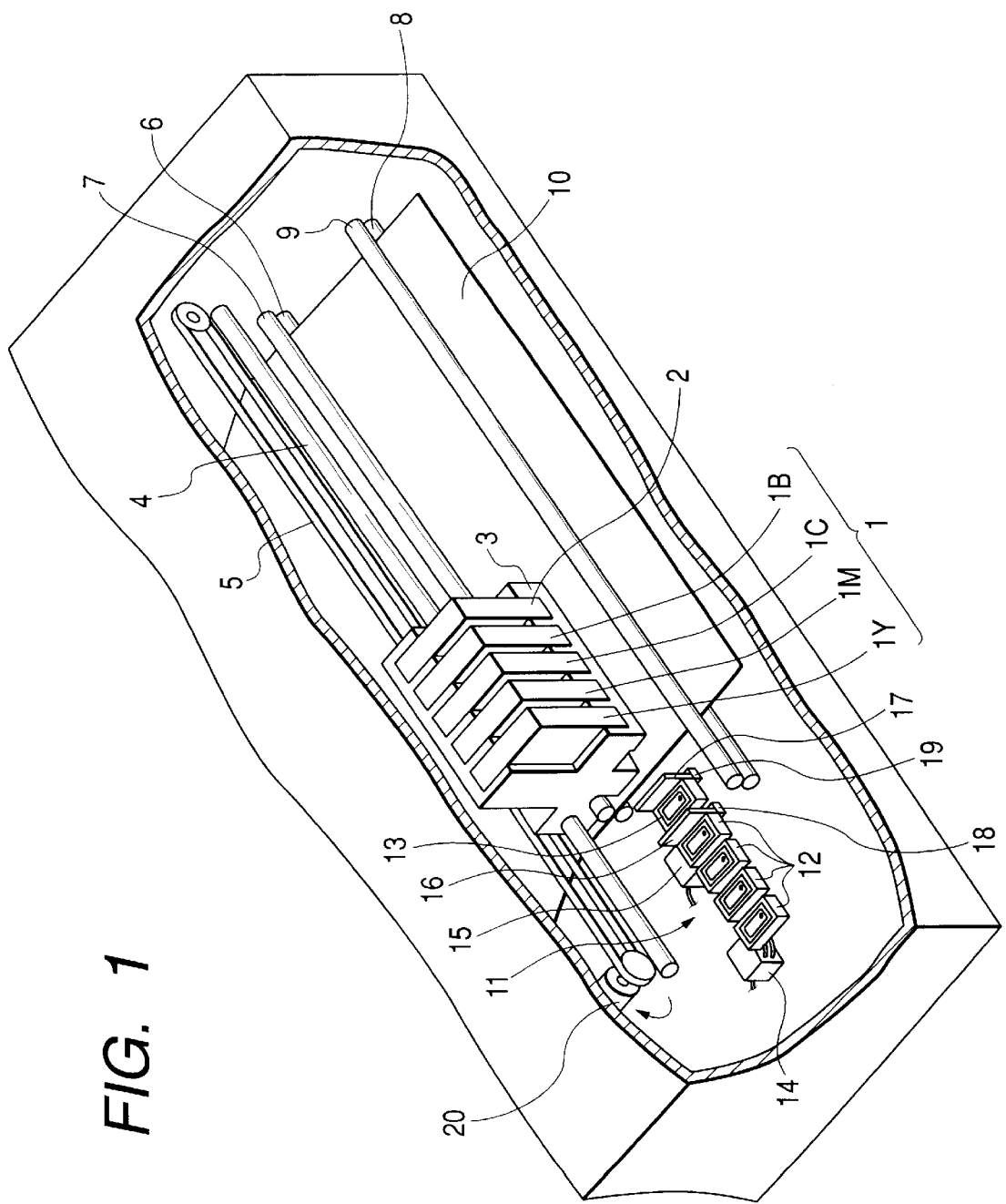
FIG. 1 is a partially broken perspective view typically illustrating an ink-jet printer to which the present invention is applied.

FIG. 1 is a typical perspective view illustrating the schematic construction of an exemplary ink-jet printer to which the present invention is applied. In FIG. 1, reference numerals 1 and 2 indicate a cartridge constructing a printing head from which inks are ejected to conduct printing, and a cartridge constructing a liquid-composition-ejecting head for ejecting a liquid composition, respectively. In an example illustrated, four cartridges 1 for printing using four inks of different colors and a cartridge 2 for ejection of the liquid composition are used.

Each cartridge 1 for printing has such a structure that an ink tank and an ink-ejecting part (printing part) are provided at upper and lower portions thereof, respectively. The cartridge 2 for the liquid composition has such a structure that a liquid composition tank and an liquid-composition-ejecting part are provided at upper and lower portions thereof, respectively. These cartridges 1, 2 are separately provided with a connector for receiving driving signals and the like. Reference numeral 3 designates a carriage.

On the carriage 3, four head cartridges (printing heads) 1 for printing to conduct printing with inks of different colors from one another, and are head cartridge (liquid-composition-ejecting head) 2 for ejection of the liquid composition are positioned and mounted. A connector holder for transmitting signals for driving the respective printing heads 1 and the liquid-composition-ejecting head 2, and the like is provided on the carriage 3. The connector is electrically connected to the respective head cartridges 1 and 2 through the connector holder.

The respective printing heads 1 contain respective inks of different colors, for example, inks of yellow (Y), magenta (M), cyan (C) and black (B). In FIG. 1, printing head cartridges (printing heads) 1Y, 1M, 1C and 1B of the respective inks of yellow, magenta, cyan and black are mounted in this order from the left side. The liquid-composition-ejecting head cartridge (liquid-composition-ejecting head) 2 containing the liquid composition is mounted at the right end.

In FIG. 1, reference numeral 4 indicates a scanning rail extending in a main scanning direction of the carriage 3 and slidably supporting the carriage, and 5 a driving belt for transmitting driving power for reciprocating the carriage 3. Reference numerals 6, 7 and 8, 9 designate pairs of conveying rollers which are arranged in front and in rear of a printing position by the printing heads and hold and convey a recording medium 10. The recording medium 10 such as paper is guided and supported on a platen (not illustrated) for regulating a printing surface flat at the printing position in contact under pressure. At this time, ejection-orifice-forming faces of the respective head cartridges (heads) 1, 2 mounted on the carriage 3 are located between the recording medium conveying rollers 7, 9 projecting downward from the carriage 3 so as to oppose in parallel with the recording medium 10 in contact under pressure with a guide surface of the platen (not illustrated).

In the vicinity of a home position provided on the left side away from the printing region of the ink-jet printer shown in FIG. 1, is arranged a recovery unit 11. The recovery unit 11 is vertically movably provided with four caps 12 corresponding to the four printing heads (head cartridges) 1Y, 1M, 1C and 1B and a cap 13 corresponding to the liquid-composition-ejecting head (head cartridge) 2. When the carriage 3 is located at the home position, the corresponding caps 12, 13 are brought into contact with the ejection-orifice-forming faces of the respective heads 1, 2, whereby the ejection orifices of the heads 1, 2 are closely sealed (capped). By this capping, the thickening or crusting of the inks due to evaporation of solvents in the inks is prevented, and so occurrence of ejection failure is prevented.

The recovery unit 11 is also equipped with a suction pump 14 communicating with the caps 12 and a suction pump 15 communicating with the cap 13. These pumps 14, 15 are used in capping the respective ejection-orifice-forming faces with the caps 12, 13 to practice a suction recovery treatment when the printing heads 1 and/or the liquid-composition-ejecting head 2 cause ejection failure. The recovery unit 11 is further provided with two wiping members (blades) 16, 17 composed of an elastic member such as rubber. The blade 16 is held by a blade holder 18, and the blade 17 is held by a blade holder 19.

In the schematic drawing in the present invention, the blade holders 18, 19 are lifted and lowered by a blade elevating mechanism (not illustrated) driven by utilizing the movement of the carriage 3, whereby the blades 16, 17 are lifted and lowered between a projected (lifted) position (wiping position) to wipe the inks and foreign matter attached to the ejection-orifice-forming faces of the heads (cartridges) 1, 2 and a receded position (stand-by position) coming into no contact with the ejection-orifice-forming faces. In this case, the blade 16 for wiping the printing heads 1 and the blade 17 for wiping the liquid-composition-ejecting head 2 are constructed in such a manner that they can be caused to separately go up and down independently of each other.

When the carriage 3 is moved from the right side (printing region side) in FIG. 1 to the home position side, or moved from the home position side to the printing region side, the blade 16 comes into contact with the ejection-orifice-forming faces of the respective printing heads 1, and the blade 17 comes into contact with the ejection-orifice-forming face of the liquid-composition-ejecting head 2, thereby performing a wiping operation against the ejection-orifice-forming faces by relative movement.

Figure 2:
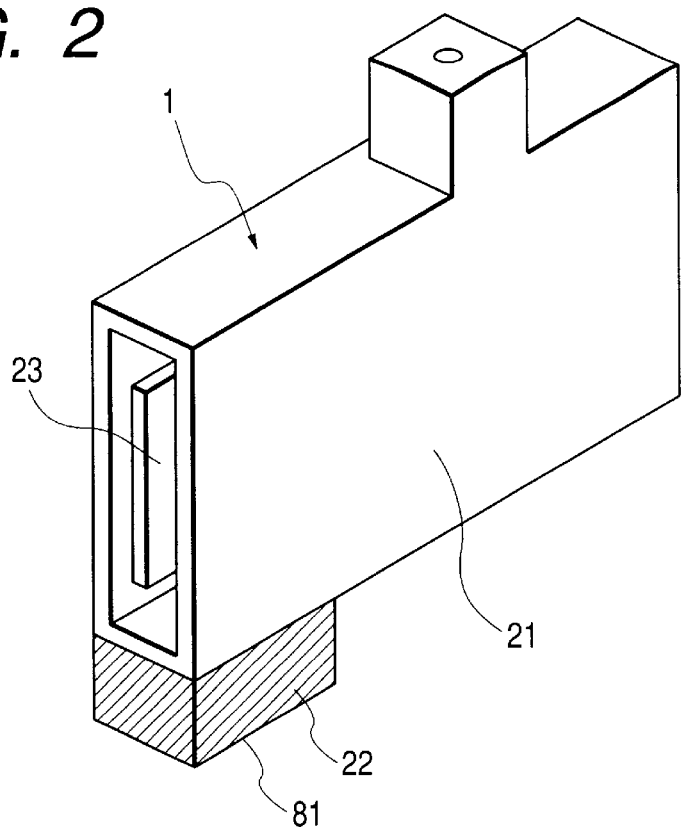
FIG. 2 is a typical perspective view of a head cartridge in FIG. 1.

FIG. 2 is a typical perspective view illustrating a printing head (cartridge) 1 of a structure in which an ink-ejecting part and an ink tank are integrally formed. Incidentally, a liquid-composition-ejecting head 2 has substantially the same structure as the printing head 1 except that a liquid stored and used is a liquid composition. In FIG. 2, the printing head 1 has an ink tank 21 at an upper portion and an ink-ejecting part (printing head part) 22 at a lower portion, and further a head-side connector 23 for receiving signals for driving the ink-ejecting part 22, and the like and outputting a signal for detecting the amount of a remaining ink. This connector is provided at a position in parallel with the ink tank 21.

The printing head 1 has an ejection-orifice-forming face 81 on the bottom side (on the side of a recording medium 10) in FIG. 2, and a plurality of ejection orifices are formed in the ejection-orifice-forming face 81. An ejection-energy-generating element for generating energy necessary for ejecting an ink is arranged in a liquid passage portion communicating with each ejection orifice. The printing head (head cartridge) 1 is an ink-jet printing means for ejecting an ink to conduct printing and is constructed by an exchangeable ink-jet cartridge in which the ink-ejecting part 22 and the ink tank 21 are integrally formed. This printing head 1 is an ink-jet printing means which ejects an ink utilizing thermal energy and equipped with an electrothermal converter for generating thermal energy. The printing head 1 ejects an ink from an ejection orifice utilizing a pressure change caused by growth and contraction of a bubble by film boiling caused by the thermal energy applied by the electrothermal converter.

Figure 3:
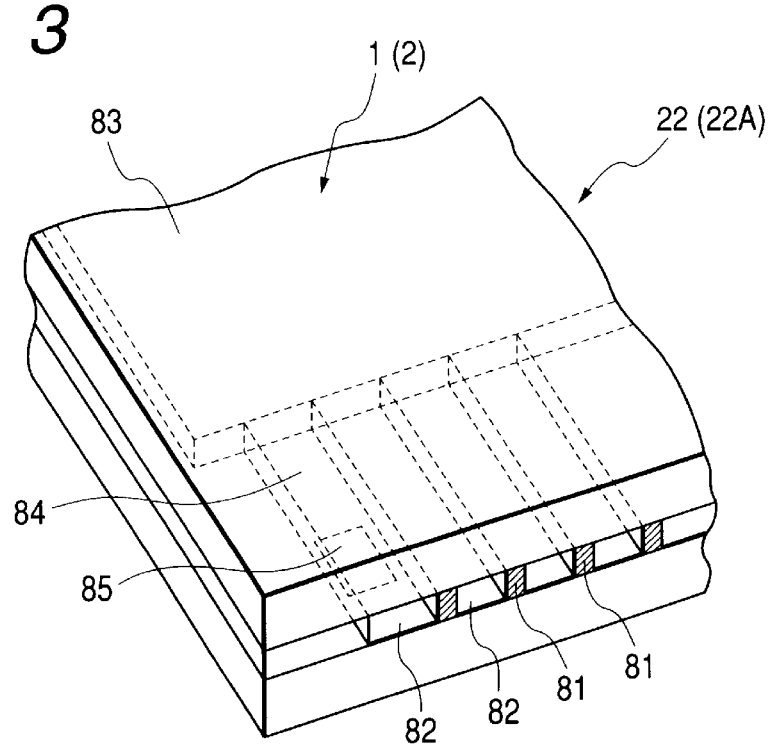
FIG. 3 is a partial perspective view typically illustrating the structure of an ink ejecting part of the head cartridge in FIG. 1.

FIG. 3 is a partial perspective view typically illustrating the structure of the ink-ejecting part 22 (liquid-composition-ejecting part 22A) of the printing head 1 (liquid-composition-ejecting head 2). In FIG. 3, a plurality of ejection orifices 82 are formed at a prescribed pitch in an ejection-orifice-forming face 81 opposing to a recording medium (paper for printing, or the like) 10 with a prescribed space (for example, about 0.5 to 2.0 mm). An electrothermal converter (heating resistor or the like) 85 for generating energy for ejection of an ink is arranged along a wall surface of each liquid passage 84 communicating a common liquid chamber 83 with each of the ejection orifice 82. The plural ejection orifices 82 are arranged in such a positional relation that they stand in a direction intersecting with a moving direction (main scanning direction) of the printing head 1, thereby constructing the printing head in which the corresponding electrothermal converter 85 is driven (energized) on the basis of an image signal or ejection signal to film-boil an ink in the liquid passage 84, and the ink is ejected from the ejection orifice 82 by a pressure generated at this time.

FIGS. 4A to 4D, 5A to 5D and 6A to 6D typically illustrate a wiping operation of the ink-jet printer described above.

Figure 4A:
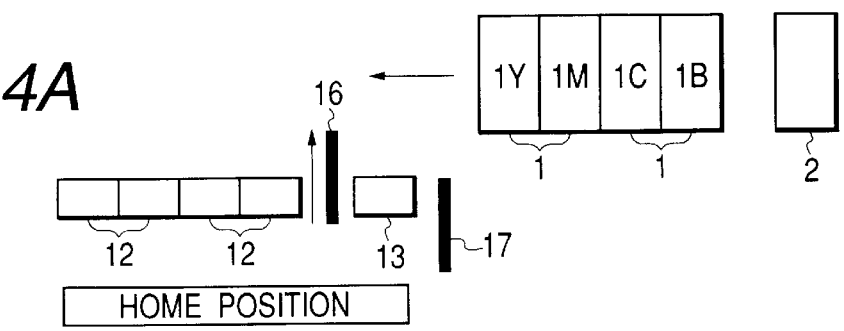
Figure 4B:
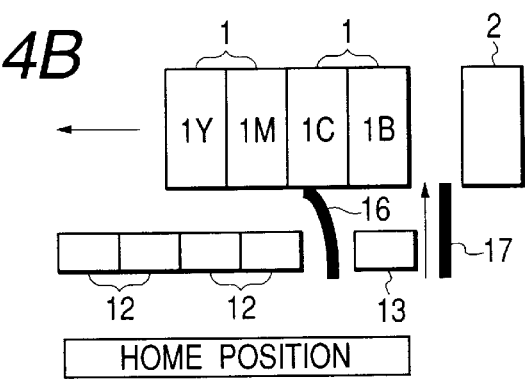

FIGS. 4A to 4D show the case where the carriage 3 is moved from the printing region side to the home position side. In FIG. 4A, the printing heads 1 and liquid-composition-ejecting head 2 mounted on the carriage 3 are moved from the right side (the side of the printing region) toward the home position. The blade 16 for inks located between the caps 12 for inks and the cap for liquid composition is first lifted and successively wipes the printing heads 1Y, 1M, 1C, 1B with the movement of the carriage as illustrated in FIG. 4B.

Figure 4C:
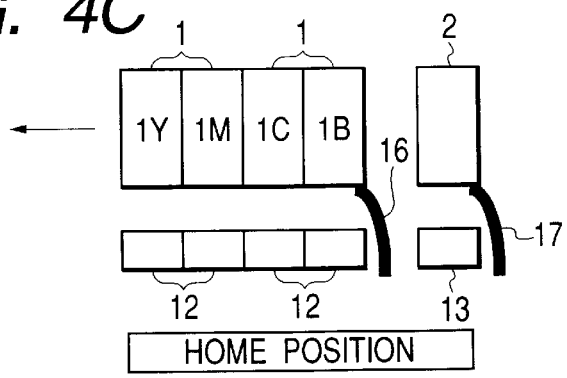
Figure 4D:
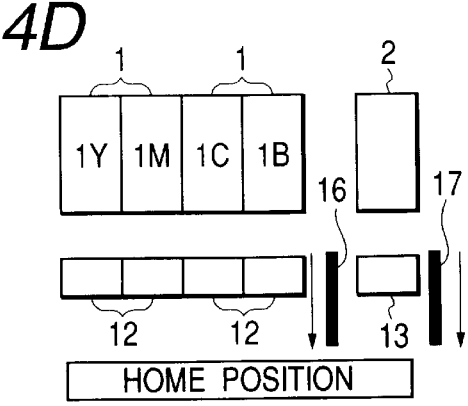
Figure 5A:
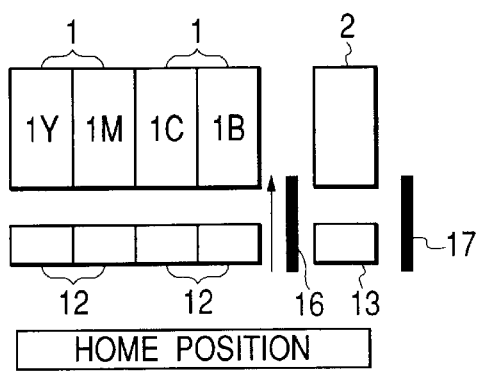
Figure 5B:
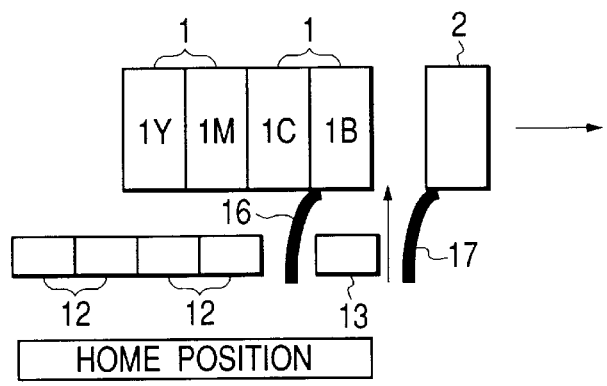
Figure 5C:
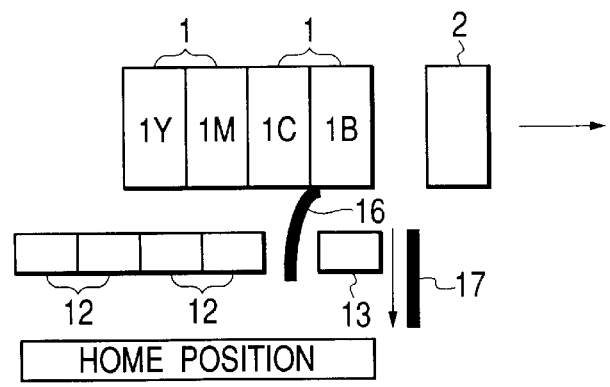
Figure 5D:
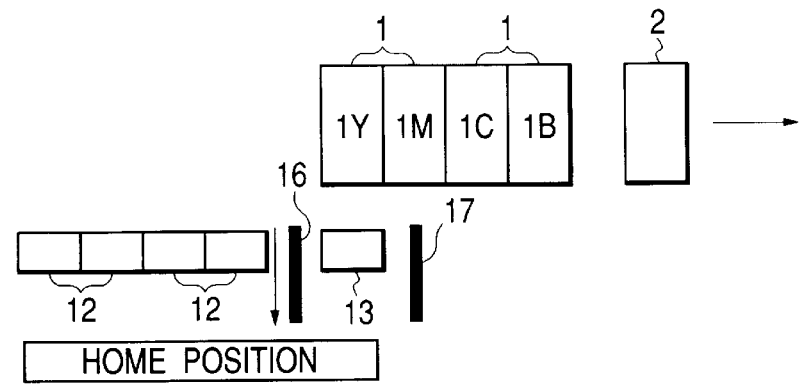

As illustrated in FIG. 4C, the blade 17 for liquid composition is lifted after the printing heads 1 pass through over the blade 17 for the liquid composition, and at the same time wipes the ejection-orifice-forming face of the liquid-composition-ejecting head 2 as illustrated in FIG. 4D. After the blade 16 for inks wipes the forth printing head 1 and the blade 17 for liquid composition wipes the liquid-composition-ejecting head 2, the respective blades 16, 17 are lowered to cause them to stand by at the stand-by positions thereof. In FIGS. 4A to 4D, the apparatus is so constructed that the wiping by the blades 16, 17 is practiced when the carriage 3 is moved from the right side (printing region) in FIG. 1 to the home position side where the recovery unit 11 is provided. However, the wiping direction is not limited to this direction, and the wiping may be performed when the carriage 3 is moved from the home position side to the right side (printing region side).

In FIGS. 5A to 5D, the printing head 1 and the liquid-composition-ejecting head 2 are wiped at the same time by lifting the blade 16 for inks and the blade 17 for liquid composition at the same time (5A), and moving the carriage 3 in the right direction (printing region side) (5B). At the same time as completion of the wiping of the liquid-composition-ejecting head 2, only the blade 17 for liquid composition is lowered to a stand-by position, and remaining printing heads 1 are wiped by the blade 16 for inks as they are (5C). Lastly, as illustrate in FIG. 5D, the blade 16 for inks is lowered at the wiping of the time all the printing heads 1 has been completed, thereby completing a series of wiping operation.

By adopting such a wiping direction as described in FIGS. 5A to 5D, a possibility that droplets attached to the blades 16, 17 removed by the wiping may be flown to a conveying part for the recording medium 10 due to the elasticity of the blades to stain the recording medium 10 can be avoided.

Figure 6A:
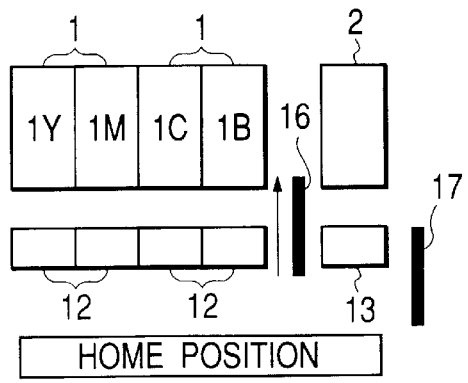
Figure 6B:
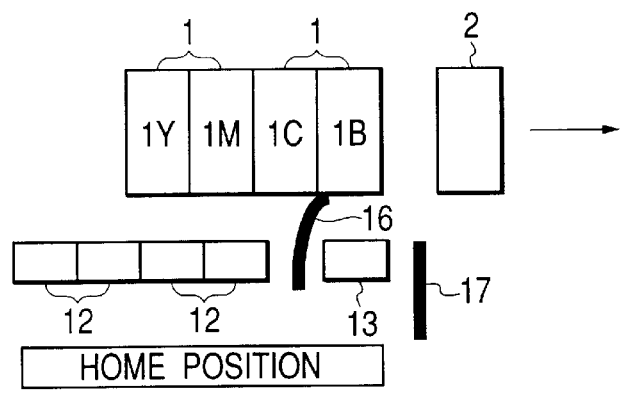
Figure 6C:
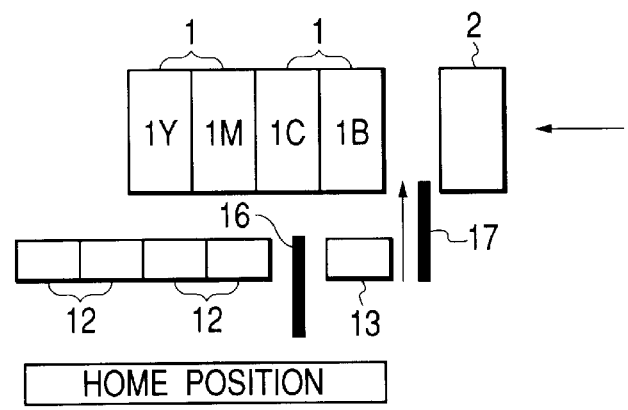
Figure 6D:
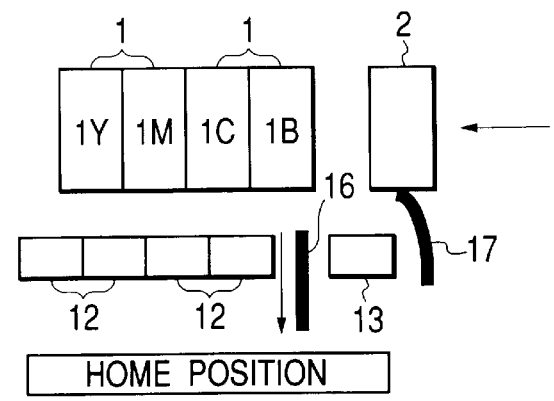

As shown in FIGS. 6A to 6D, a wiping direction of the printing heads 1 may be caused to differ from a wiping direction of the liquid-composition-ejecting head 2. In FIGS. 6A to 6D, when the carriage 3 is moved from the home position side to the right side (printing region side) as shown in, for example, FIGS. 6A and 6B, the printing heads 1 are wiped by the blade 16 for inks. When the carriage 3 is moved from the printing region side to the home position side as shown in FIGS. 6C and 6D, only the liquid-composition-ejecting head 2 may be wiped by the blade 17 for liquid composition. By adopting such a wiping direction, a possibility that inks flown by elastic force of the blade 16 may be attached to the liquid-composition-ejecting head 2 or on the contrary that the liquid composition flown by the elastic force of the blade 17 may be attached to the printing head 1 can be reduced to a great extent.

Figure 7:
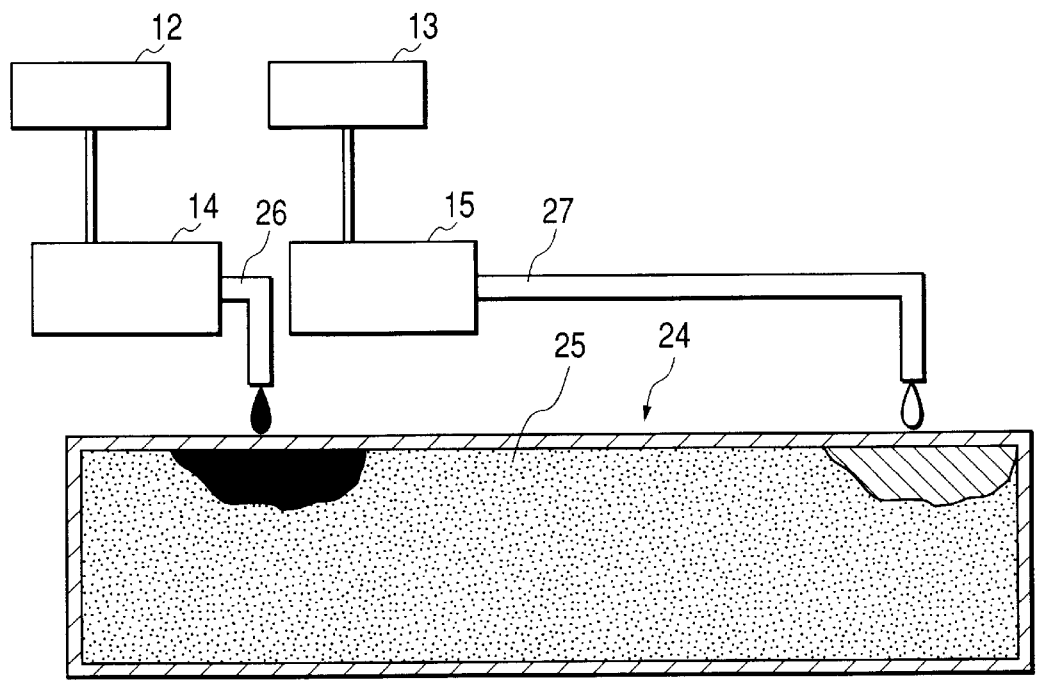
FIG. 7 typically illustrates a waste liquid recovering line of the ink-jet printer shown in FIG. 1.

In FIG. 1, the caps 12 for the printing head 1 and the cap 13 for the liquid-composition-ejecting head 2 are separately provided independent of each other (specialized), and the suction pumps 14, 15 respectively connected to these caps 12, 13 are separately provided independent of each other (specialized). By doing so, these waste liquids can be treated without bringing the inks into contact with the liquid composition reactive to the inks in the caps 12, 13 and the pumps 14, 15, and so high reliability can be retained. FIG. 7 typically illustrates a waste liquid recovering line for recovering the inks and liquid composition discharged from the pumps 14, 15 into a waste ink tank. In FIG. 7, waste inks sucked from the printing heads 1 by the pump 14 communicating with the caps 12, and a waste liquid sucked from the liquid-composition-ejecting head 2 by the pump 15 communicating with the cap 13 are recovered into a waste liquid tank 24 through respective lines independent of each other.

The waste liquid tank 24 is so constructed that a porous absorbing member 25 is filled in the interior thereof, and the waste liquid is absorbed in and held be the absorbing member 25. In FIG. 7, a waste ink conduit 26 from the suction pump 14 for the printing heads 1 and a waste liquid conduit 27 from the suction pump 15 for the liquid-composition-ejecting head 2 are separately connected to positions separate from each other at both ends of the waste liquid tank 24. By this arrangement, the liquid composition and the inks within the waste liquid tank 24 come into contact with each other for the first time in such a state that the liquids have been fully absorbed in the absorbing member 25, the amount of liquids absorbed and held by the absorbing member 25 can be sufficiently ensured.

Figure 8:
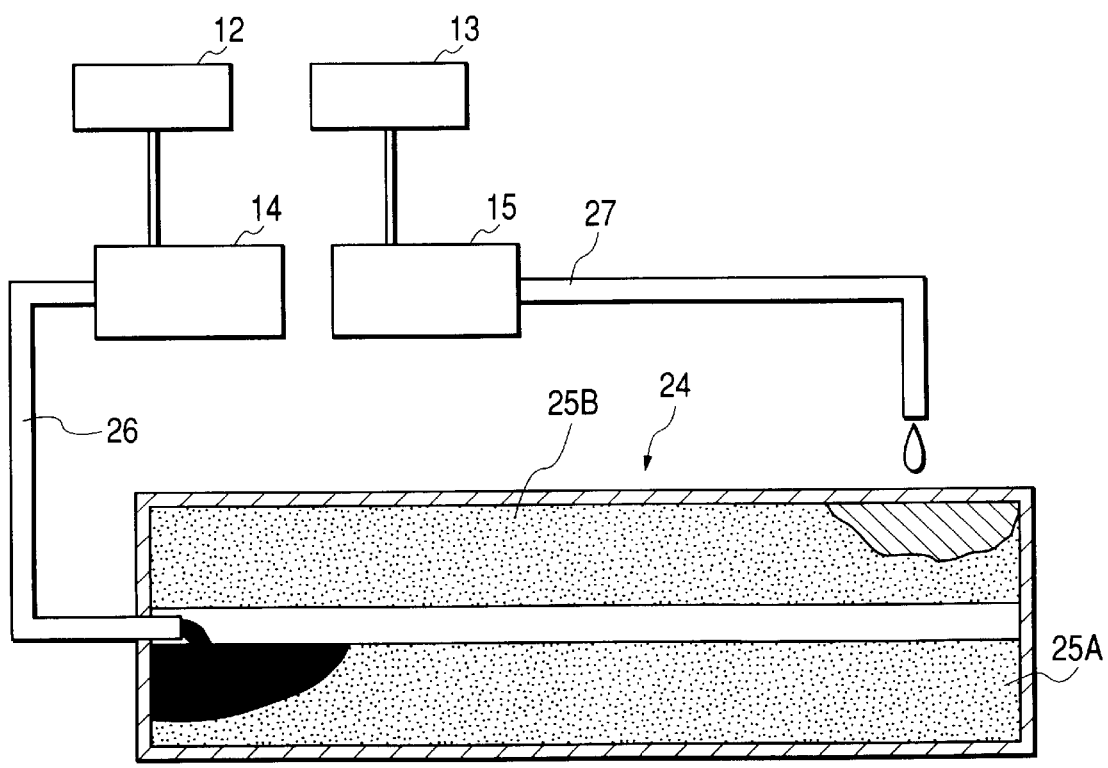
FIG. 8 typically illustrates a partially modified example of the waste liquid recovering line shown in FIG. 7.
Figure 9:
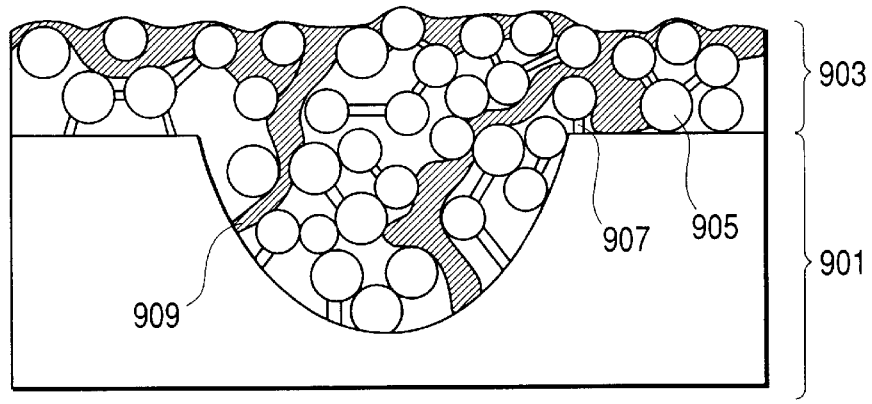
FIG. 9 is a typical cross-sectional view illustrating a state of a colored portion when ink-jet recording has been conducted on coated paper.

FIG. 8 typically illustrates a waste liquid recovering line which is so constructed that in the waste liquid recovering line shown in FIG. 7, the absorbing member 25 in the waste liquid tank 24 is arranged in two stages of upper and lower parts, the inks are caused to be absorbed in the lower absorbing member 25A, and the liquid composition is caused to be absorbed in the upper absorbing member 25B. According to the construction shown in FIG. 8, even when the lower ink absorbing member 25A is filled up with the inks, the dyes in the inks are fixed to the upper absorbing member 25B by reacting with the liquid composition absorbed in the upper absorbing member 25B, so that the inks are prevented from leaking out to stain both interior and exterior of the printer.

An ink-jet recording apparatus according to another embodiment comprises an ink container portion which contains an anionic or cationic aqueous ink containing a coloring material, a liquid composition container portion which contains the liquid composition according to the present invention, preferably, a liquid composition containing fine particles dispersed therein and electrically charged at the surface in a polarity opposite to the aqueous ink, in a dispersed state, and ink-jet heads for independently ejecting the aqueous ink contained in the ink container portion and the liquid composition contained in the liquid composition container portion. These will hereinafter be described.

Figure 10:
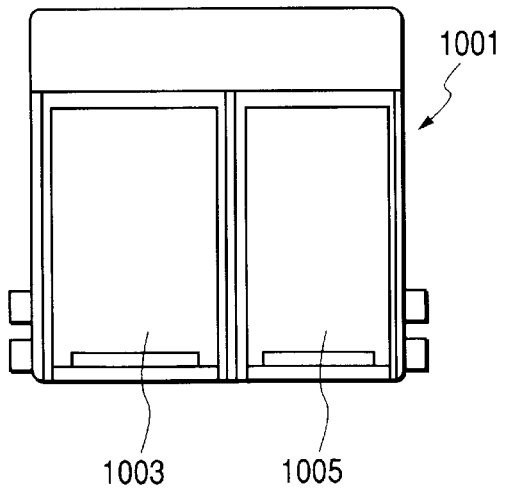
FIG. 10 is a schematic view illustrating an ink cartridge according to an embodiment of the present invention.
Figure 11:
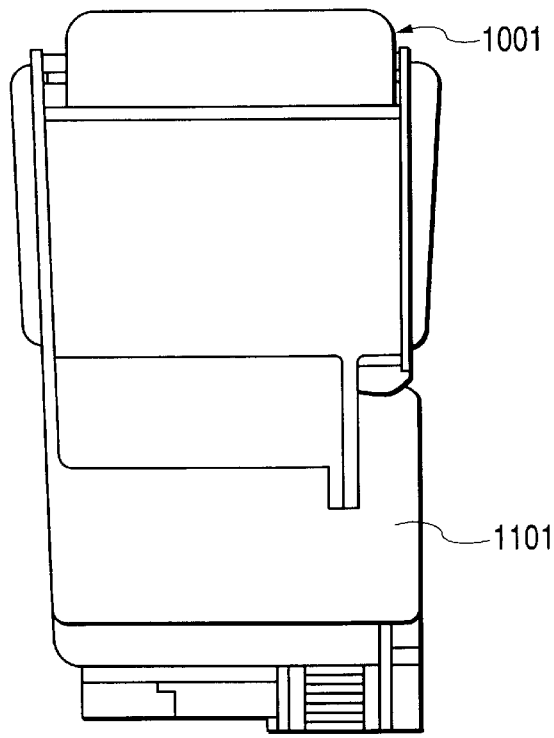
FIG. 11 is a schematic view illustrating a recording head in which the ink cartridge shown in FIG. 10 has been installed.

FIG. 10 illustrates an example of such a cartridge 1001. Reference numerals 1003 and 1005 indicate an ink container portion containing an ink and a liquid composition container portion containing a liquid composition, respectively. This cartridge is so constructed that it is detachably installed in a recording head 1101, from which the ink and the liquid composition can be ejected, as illustrated in FIG. 11, and that the liquid composition and the ink are fed to the recording head 1101 in case where the cartridge 1001 is installed in the recording head 1101.

The ink-jet recording apparatus used in the present invention are not limited to the apparatus in which the head and the ink cartridge are separately provided as described above. Therefore, a device in which these members are integrally formed as shown in FIG. 15 can also be preferably used.

Figure 15:
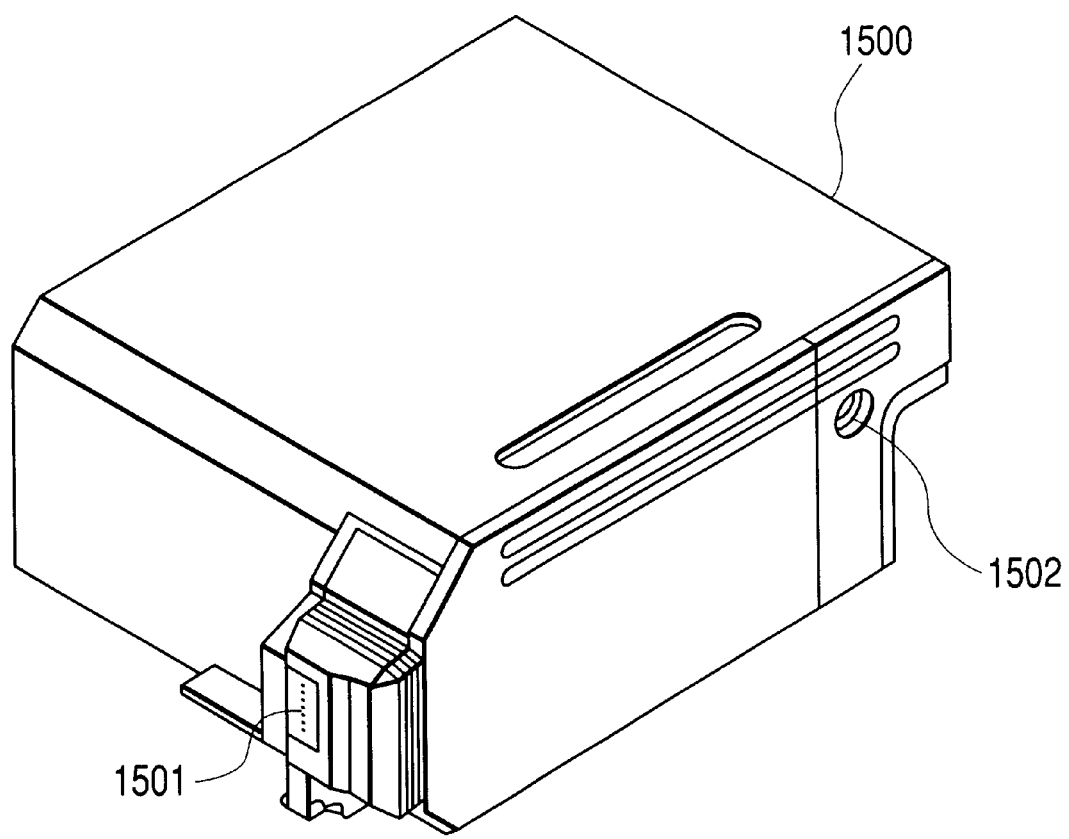
FIG. 15 is a perspective view of a recording unit.

In FIG. 15, reference numeral 1500 designates a recording unit, in the interior of which an ink container portion containing an ink, for example, an ink-absorbing member, is contained. The recording unit 1500 is so constructed that the ink in such an ink-absorbing member is ejected in the form of ink droplets from a head 1501 having a plurality of orifices. For example, polypropylene or polyurethane may be used as a material for the ink-absorbing member. Reference numeral 1502 indicates an air passage for communicating the interior of the recording unit 1500 with the atmosphere.

Figure 12:
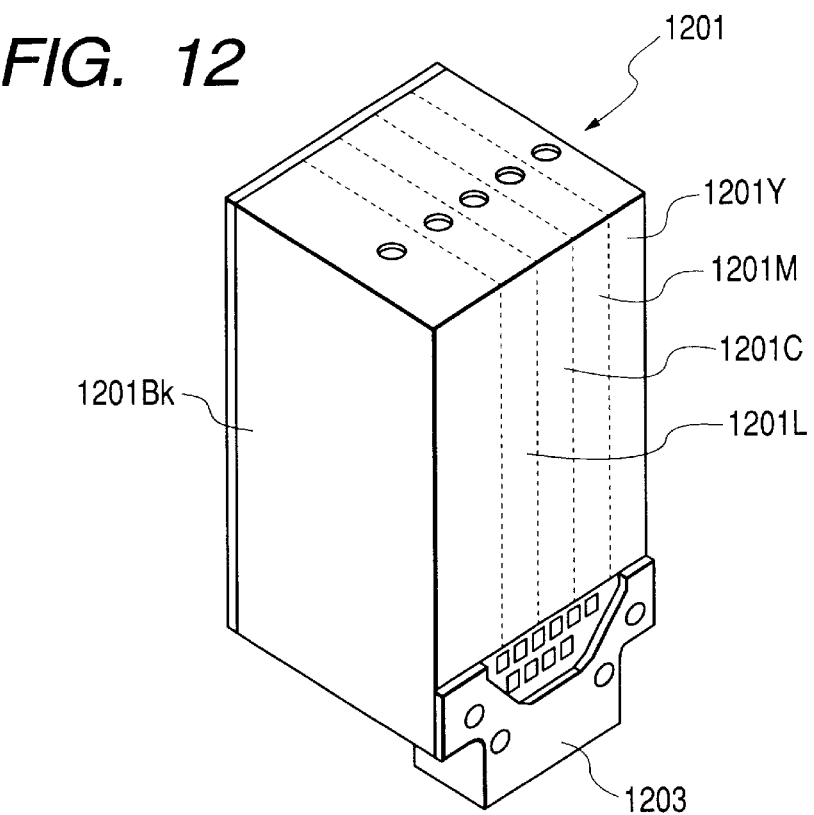
FIG. 12 is a schematic view illustrating a recording unit according to an embodiment of the present invention.

As another embodiment of the recording unit used in the present invention, may be mentioned a recording unit comprising container portions in an ink tank, which respectively contain inks and a liquid composition, and integrally equipped with a recording head for ejecting the inks and liquid composition, specifically, as illustrated in FIG. 12, a recording unit 1201 comprising a container portion 1201L containing the liquid composition, a container portion 1201Bk containing a black ink and container portions 1201Y, 1201C and 1201M respectively containing color inks of yellow, cyan and magenta and equipped with a recording head 1203 in which ink flow paths are separately formed in such a manner that the respective inks can be separately ejected.

Figure 16:
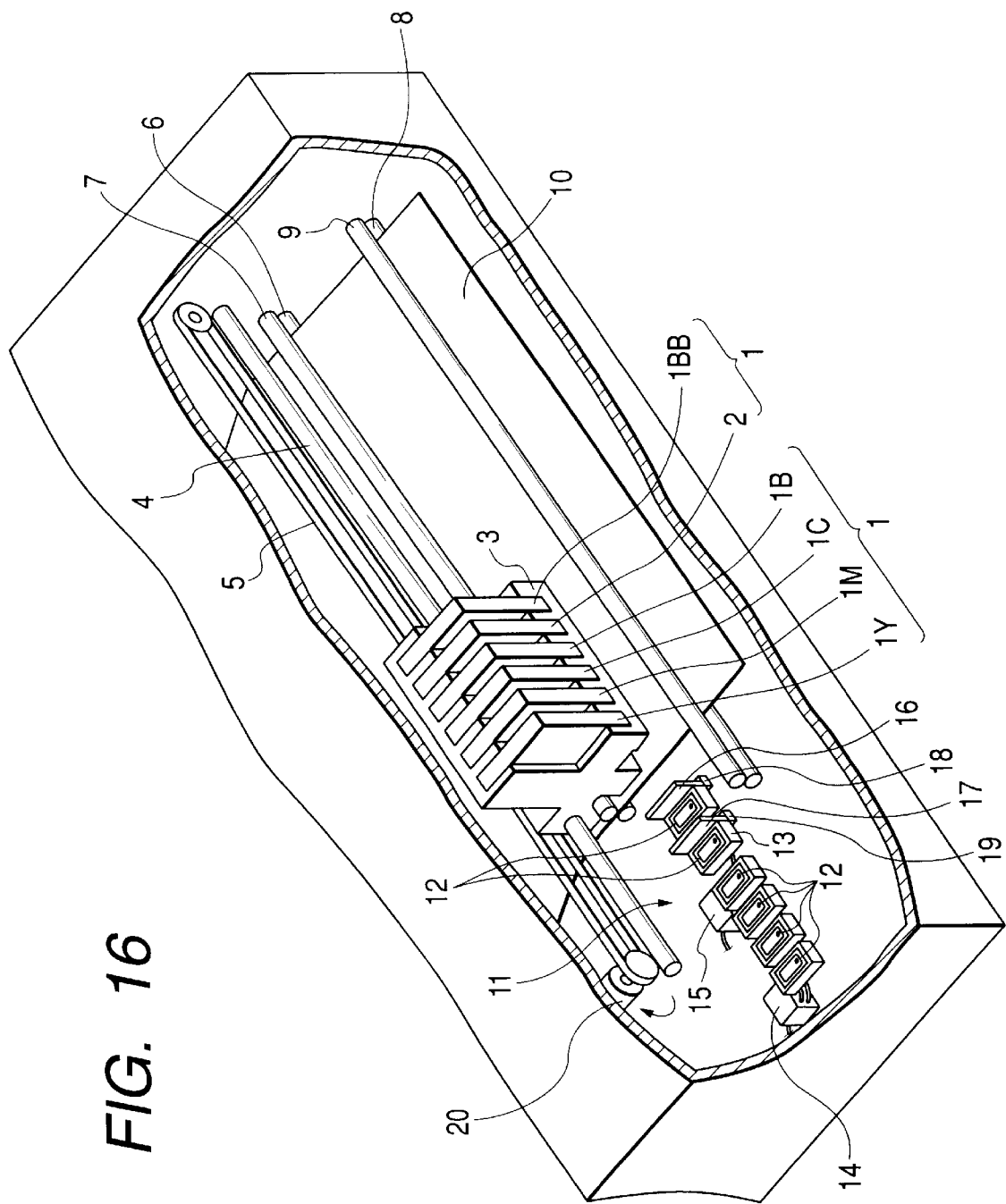
FIG. 16 is a partially broken perspective view typically illustrating an ink-jet printer according to an embodiment of the present invention.

FIG. 16 is a typical perspective view illustrating the schematic construction of an ink-jet printer according to another embodiment of the present invention.

In FIG. 16, reference numeral 4 indicates a scanning rail extending in a main scanning direction of a carriage 3 and slidably supporting the carriage, and 5 a driving belt for transmitting driving power for reciprocating the carriage 3. Reference numerals 6, 7 and 8, 9 designate pairs of conveying rollers which are arranged in front and in rear of a printing position by the printing heads and hold and convey a recording medium 10. The recording medium 10 such as paper is guided and supported on a platen (not illustrated) for regulating a printing surface flat at the printing position in contact under pressure. At this time, ejection-orifice-forming faces of the respective head cartridges (heads) 1, 2 mounted on the carriage 3 are located between the recording medium conveying rollers 7, 9 projecting downward from the carriage 3 so as to oppose in parallel with the recording medium 10 in contact under pressure with a guide surface of the platen (not illustrated).

In FIG. 16, on the carriage 3, six head cartridges are positioned and mounted, and in this embodiment, are arranged in the order of a printing head 1Y for a yellow ink, a printing head 1M for a magenta ink, a printing head 1C for a cyan ink, a printing head 1B for a black ink, a liquid-composition-ejecting head 2 and a printing head 1BB for a second black ink from the left side to the right side in FIG. 16. The liquid-composition-ejecting head 2 serves to eject the liquid composition reactive to coloring materials in the inks to the recording medium 10. The printing head 1BB for the second black ink arranged at the right end is a printing head used for a black ink employed, for example, upon secondary scanning printing in reciprocating printing. More specifically, the apparatus is so constructed that the liquid-composition-ejecting head 2 is arranged next to (next door on the right side of) the printing head 1B for the black ink in the above-described respective embodiments, and the printing head 1BB for the second black ink is further arranged next (at the right end).

In FIG. 16, a recovery unit 11 is arranged on the left side of the printing region. In the recovery unit 11, caps 12 for capping the printing heads 1Y, 1M, 1C and 1B are successively arranged from the left to the right corresponding to the arrangement of the head cartridges 1, 2, a cap 13 for capping the liquid-composition-ejecting head 2 is arranged next (next on the right side), and a cap 12 for capping the printing head 1BB for the second black ink is further arranged next on the right side (at the right end). The respective caps are provided vertically movably. When the carriage 3 is located at the home position, the corresponding caps 12, 13 are brought into contact with the ejection-orifice-forming faces of the respective heads 1, 2, whereby the ejection orifices of the heads 1, 2 are closely sealed (capped). By this capping, the thickening or crusting of the inks due to evaporation of solvents in the inks is prevented, and so occurrence of ejection failure is prevented.

The recovery unit 11 is also equipped with a suction pump 14 communicating with the caps 12 and a suction pump 15 communicating with the cap 13. These pumps 14, 15 are used in capping the respective ejection-orifice-forming faces with the caps 12, 13 to practice a suction recovery treatment when the printing heads 1 and/or the liquid-composition-ejecting head 2 cause ejection failure. A blade 17 for the liquid-composition-ejecting head 2 is further arranged between the fifth cap 13 for the liquid composition from the left end and the sixth cap 12 for the black ink (located at the right end), and a blade 16 for the respective printing heads 1 is arranged on the right side (printing region side) of the cap 12 located at the right end. The blade 17 is held by a blade holder 19, and the blade 16 is held by a blade holder 18. In this embodiment, the blade holders 18, 19 are lifted and lowered by a blade elevating mechanism (not illustrated) driven by utilizing the movement of the carriage 3, whereby the blades 16, 17 are lifted and lowered between a projected position (wiping position) to wipe the inks and foreign matter attached to the ejection-orifice-forming faces of the heads 1, 2 and a receded position (stand-by position) coming into no contact with the ejection-orifice-forming faces. In this case, the blade 16 for wiping the printing heads 1 and the blade 17 for wiping the liquid-composition-ejecting head 2 are constructed in such a manner that they can be caused to separately go up and down independently of each other.

FIGS. 17A to 17F typically illustrate a wiping operation of the ink-jet printer shown in FIG. 16. As shown in FIG. 17A, the respective heads mounted on the carriage 3 are moved from the right side (the side of the printing region) toward the home position after the blade 16 for the printing heads is projected (lifted). The lifted blade 16 for the printing heads successively wipes the printing heads 1 with the movement of the carriage toward the left side as illustrated in FIG. 17B. As illustrated in FIG. 17C, the blade 16 is receded (lowered) to the stand-by position at the time the liquid-composition-ejecting head 2 came to this side (next door on the right side) of the blade 16 for the printing heads to prevent the contact of the blade 16 with the liquid-composition-ejecting head 2.

When the carriage 3 is moved toward the left side, and the liquid-composition-ejecting head 2 passes through the blade 16 for the printing heads, both blades 16, 17 are projected (lifted) as illustrate in FIG. 17D. As illustrated in FIG. 17E, wiping of the liquid-composition-ejecting head 2 by the blade 17 and wiping of the printing head 1BB located at the right end by the blade 16 are practiced at the same time with the movement of the carriage 3 toward the left side. After wiping of all the heads 1, 2 is completed, both blades 16, 17 are receded (lowered) to cause them to stand by at the stand-by positions thereof as illustrated in FIG. 17F.

In the embodiment illustrated in FIGS. 16 and 17A to 17F, the apparatus is so constructed that the wiping by the blades 16, 17 is practiced when the carriage 3 is moved from the printing region side (right side) to the home position side where the recovery unit 11 is provided. However, the wiping direction is not limited to this direction, and the wiping may be performed when the carriage 3 is moved from the home position side to the right side (printing region side).

The ink-jet printer illustrated in FIG. 16 is so constructed that the liquid composition according to the present invention, which is reactive to a coloring material in an ink, is ejected on the printing medium 10 from the liquid-composition-ejecting head 2 to bring it into contact with the ink ejected from each printing head 1 on the printing medium 10, whereby a recorded article can be formed. The coloring material in the ink is reacted with the liquid composition on the printing medium 10, whereby the coloring material in the ink is adsorbed in a monomolecular state on the surfaces of the fine particles, and an image is formed by such fine particles. Therefore, an image excellent in coloring property and color evenness is provided.

Incidentally, in the recording apparatus used in the present invention, the ink-jet recording apparatus in which thermal energy is applied to an ink to eject droplets of the ink has been described by way of example. However, the present invention can also be used in other ink-jet recording apparatus of a piezo-system using a piezoelectric element.

The present invention will hereinafter be described more specifically by the following examples and comparative examples. Incidentally, all designations of "part" or "parts" and "%" as will be used in the following examples mean part or parts by weight and % by weight unless expressly noted.

The following two ink sets and two liquid compositions were prepared for practice of the recording process according to the present invention.
Ink Set 1 (resin-dispersing ultrafine particles).
Ink Set 2 (self-dispersing ultrafine particles).
Liquid composition.
(Preparation of Ink Set 1)
Preparation of Yellow Ink 1:

A styrene-acrylic acid copolymer (Joncryl 678, trade name, product of Johnson Polymer Co.) was mixed with a prescribed amount of potassium hydroxide necessary for neutralize the copolymer and water, and they were stirred and mixed at a temperature kept at about 60° C. to prepare a 10% aqueous solution of the styrene-acrylic acid copolymer. The syrene-acrylic acid copolymer prepared in the above-described manner was used as a dispersing agent to prepare the following yellow pigment dispersion.

| Syrene-acrylic acid copolymer (10% Aqueous solution) | 30 parts |
| Pigment Yellow 74 | 6 parts |
| Glycerol | 20 parts |
| Diethylene glycol | 20 parts |
| Triethylene glycol | 10 parts |
| Ion-exchanged water | 14 parts. |

The above materials were charged into a batch type vertical sand mill, and glass beads having a diameter of 200 μm were filled as a grinding medium to conduct a dispersing treatment over 5 hours at a grinding medium speed of 9,000 rpm while cooling with water. After this yellow pigment dispersion was subjected to a centrifugal treatment (10,000 rpm, 30 minutes), the whole dispersion was diluted to ½ with water to prepare an ink. This ink was subjected to a additional dispersing treatment for 5 hours by the above high-speed mill. After the resultant dispersion was subjected to a centrifugal treatment (10,000 rpm, 30 minutes), thereby removing coarse particles, an ink was prepared so as to give a prescribed composition. Lastly, 1% by mass of Acetylenol EH (trade name, product of Kawaken Fine Chemicals Co., Ltd.) was added to this ink to conduct stirring and mixing, and the resultant mixture was then filtered through a membrane filter having a pore size of 1 μm, thereby obtaining Yellow Ink 1.

The volume average particle diameter and volume particle diameter distribution of Yellow Ink 1 thus obtained were measured. A Microtrack UPA150 (manufactured by Nikkiso Co., Ltd.) was used as a measuring instrument. The measurement was conducted under the condition that Yellow Ink 1 was diluted with ion-exchanged water and then subjected to a dispersing treatment by means of an ultrasonic cleaner so as to give a sample concentration index of 0.04. As a result, the yellow pigment dispersion in Yellow Ink 1 had a volume average particle diameter of 13 nm and a 90% cumulative particle diameter of volume particle diameter distribution of 14 nm.
Preparation of Magenta Ink 1:

Magenta Ink 1 of Ink Set 1 was obtained in exactly the same manner as in Yellow Ink 1 except that Pigment Yellow 74 (6 parts) and ion-exchanged water (14 parts) in Yellow Ink 1 were changed to Pigment Red 122 (8 parts) and ion-exchanged water (12 parts). The volume average particle diameter and volume particle diameter distribution of Magenta Ink 1 thus obtained were measured in the same manner as in Yellow Ink 1. As a result, the magenta pigment dispersion in Magenta Ink 1 had a volume average particle diameter of 46 nm and a 90% cumulative particle diameter of volume particle diameter distribution of 85 nm.
Preparation of Cyan Ink 1:

Cyan Ink 1 of Ink Set 1 was obtained in exactly the same manner as in Yellow Ink 1 except that Pigment Blue 15:3 was used in place of Pigment Yellow 74 in Yellow Ink 1. The volume average particle diameter and volume particle diameter distribution of Cyan Ink 1 thus obtained were measured in the same manner as in Yellow Ink 1. As a result, the cyan pigment dispersion in Cyan Ink 1 had a volume average particle diameter of 50 nm and a 90% cumulative particle diameter of volume particle diameter distribution of 69 nm.
Preparation of Black Ink 1:

Black Ink 1 of Ink Set 1 was obtained in exactly the same manner as in Yellow Ink 1 except that Pigment Yellow 74 (6 parts) and ion-exchanged water (14 parts) in Yellow Ink 1 were changed to carbon black (MCF88, trade name, product of Mitsubishi Chemical Industries Limited, 10 parts) and ion-exchanged water (10 parts). The volume average particle diameter and volume particle diameter distribution of Black Ink 1 thus obtained were measured in the same manner as in Yellow Ink 1. As a result, the black pigment dispersion in Black Ink 1 had a volume average particle diameter of 48 nm and a 90% cumulative particle diameter of volume particle diameter distribution of 90 nm.
(Preparation of Ink Set 2)
Preparation of Yellow Ink 2:

Pigment Yellow 128 was used as a raw material for an ultrafinely particulate yellow pigment to obtain an anionic self-dispersing ultrafinely particulate yellow pigment the surface of which was modified with a carboxyl group by the vapor-phase process. The thus-obtained ultrafinely particulate pigment had an average particle diameter of 30 nm and a 90% cumulative particle diameter of volume particle diameter distribution of 80 nm. This ultrafinely particulate pigment was used to prepare Yellow Ink 2 in accordance with the following process.

| Ultrafinely particulate yellow pigment | 5 parts |
| Glycerol | 7 parts |
| Ethylene glycol | 7 parts |
| Trimethylolpropane | 7 parts |
| Isopropyl alcohol | 2 parts |
| Acetylenol EH | 1 part |
| Ion-exchanged water | 71 parts. |

The above materials were thoroughly mixed and stirred, and the resultant mixture was filtered under pressure through a membrane filter (Fluoropore Filter, trade name; product of Sumitomo Electric Industries, Ltd.) having a pore size of 1 µm, thereby obtaining Yellow Ink 2 of Ink Set 2.

Preparation of Magenta Ink 2:

An anionic self-dispersing ultrafinely particulate magenta pigment was obtained in exactly the same manner as in Yellow Ink 2 except that Pigment Red 122 was used as a raw material for an ultrafinely particulate magenta pigment. The thus-obtained ultrafinely particulate pigment had an average particle diameter of 35 nm and a 90% cumulative particle diameter of volume particle diameter distribution of 85 nm. This ultrafinely particulate pigment was used to obtain Magenta Ink 2 making up Ink Set 2 in the same manner as in the preparation of Yellow Ink 2.

Preparation of Cyan Ink 2:

An anionic self-dispersing ultrafinely particulate magenta pigment was obtained in exactly the same manner as in Yellow Ink 2 except that Pigment Blue 15:3 was used as a raw material for an ultrafinely particulate cyan pigment. The thus-obtained ultrafinely particulate pigment had an average particle diameter of 40 nm and a 90% cumulative particle diameter of volume particle diameter distribution of 90 nm. This ultrafinely particulate pigment was used to obtain Cyan Ink 2 making up Ink Set 2 in the same manner as in the preparation of Yellow Ink 2.

Preparation of Black Ink 2:

An anionic self-dispersing ultrafinely particulate black pigment was obtained in exactly the same manner as in Yellow Ink 2 except that carbon black (MCF88, trade name, product of Mitsubishi Chemical Industries Limited) was used as a raw material for an ultrafinely particulate black pigment. The thus-obtained ultrafinely particulate pigment had an average particle diameter of 48 nm. This ultrafinely particulate pigment was used to obtain Black Ink 2 making up Ink Set 2 in the same manner as in the preparation of Yellow Ink 2.

The preparation of a liquid composition according to the present invention will be described.

The following components were mixed into a solution, and the resultant solution was then filtered under pressure through a membrane filter (Fluoropore Filter, trade name; product of Sumitomo Electric Industries, Ltd.) having a pore size of 1 µm, thereby obtaining a liquid composition according to the present invention.

(Synthesis Example of Alumina Hydrate)

Aluminum dodeoxide was prepared in accordance with the process described in U.S. Pat. No. 4,242,271. The aluminum dodeoxide was hydrolyzed in accordance with the process described in U.S. Pat. No. 4,202,870 to prepare an alumina slurry. Water was added to this alumina slurry until the solid concentration of the alumina hydrate reached 8.2%. The pH of the alumina slurry was 9.7. A 3.9% nitric acid solution was added to the alumina slurry to adjust the pH thereof to 5.3, and the slurry was aged at 120° C. for 8 hours in an autoclave, thereby obtaining colloidal sol. The pH of the colloidal sol was adjusted to 4.0 with nitric acid and concentrated to a solids concentration of 20% to prepare an alumina hydrate slurry. The alumina hydrate in this slurry was positively charged at its surface in water to exhibit a cationic nature. This alumina hydrate slurry was diluted with and dispersed in ion-exchanged water, the resultant dispersion was dropped on a collodion membrane to prepare a sample for measurement. This sample was observed through a transmission electron microscope. As a result, the particles of the alumina hydrate were all in the form of a flat plate.

<Composition of Liquid Composition>

|  | Parts by mass |
|---|---|
| 1,5-Pentandiol | 10.0 |
| Ethylene glycol | 7.5 |
| Alumina hydrate slurry | 50.0 |
| Water | 32.5. |

After the above components were mixed for 30 minutes at 3000 rpm by an emulsifying and dispersing machine, TK Robomix (trade name, manufactured by Tokushu Kika Kogyo Co., Ltd.), the resultant dispersion was subjected to a centrifugal treatment (4000 rpm, 15 minutes) to remove coarse particles, thereby preparing a liquid composition.

The pH of the liquid composition obtained above was 3.5, the average particle diameter of fine particles was 80 nm, and the zeta potential was +41 mV. Even after the liquid composition was filled into an ink tank to conduct a shelf test for 1 month under the condition of 60° C./dry, no precipitate was observed in the ink tank, and ejection stability from a recording head was also good. Fine particle aggregates obtained from the liquid composition had a pore volume of 0.90 ml/g in a pore radius range of from 3 to 30 nm and a pore volume of 0.001 ml/g in a pore radius range exceeding 30 nm. Further, the pore volume in a pore radius range of from 3 to 20 nm was 0.89 ml/g, and the pore volume in a pore radius range exceeding 20 nm was 0.01 ml/g.

The physical properties of the liquid composition were evaluated in accordance with the following respective methods.

1) Average Particle Diameter of Fine Particles:

After the liquid composition was diluted with ion-exchanged water in such a manner that a solids concentration of the fine particles was set to 0.1%, the diluted liquid composition was dispersed for 5 minutes by an ultrasonic cleaner to measure scattering intensity by means of an electrophoretic light scattering photometer (ELS-8000, trade name, manufactured by Otsuka Denshi K.K.; liquid temperature: 25° C.; using a quartz cell). The average particle diameter was found from the scattering intensity by using the attached software in accordance with a cumulant analysis method.

2) pH:

The pH of the liquid composition was measured at a liquid temperature of 25° C. by means of a pH meter (Castanee pH Meter D-14, trade name, manufactured by Horiba Ltd.).

3) Zeta Potential:

The zeta potential of the liquid composition was measured by dispersing the liquid composition in ion-exchanged water in such a manner that a solids concentration of fine particles was set to 0.1% and then measuring a zeta potential of the resultant dispersion by means of a zeta potential meter (BI-ZETA plus, trade name, manufactured by Brookheaven Co.; liquid temperature: 20° C., using an acrylic cell).

4) Pore Radius and Pore Volume:

After a sample was pretreated in accordance with the following procedures, the sample was placed in a cell to deaerate it at 120° C. for 8 hours under reduced pressure, thereby conducting measurement by means of Omnisorb 1 manufactured by Quanthachrome Co. in accordance with the nitrogen adsorption and desorption method. The pore radius and pore volume were found from calculation in accordance with the method (J. Am. Chem. Soc., Vol. 73, 373, 1951) by Barrett et al.

(1) The liquid composition is dried at 120° C. for 10 hours under atmospheric conditions to almost evaporate a solvent component.

(2) The dried product is heated from 120° C. to 700° C. over 1 hour, and then calcined for 3 hours at 700° C.

(3) After the calcination, the calcined product is gradually cooled to ordinary temperature and ground in an agate mortar into powder.

The liquid composition and inks obtained in the above-described manner were used to conduct recording on Canon PPC paper (A4-sized paper). An ink-jet recording apparatus, was used BJF-8500, and a head and a tank for a waterproof improving agent for plain-paper were used for the liquid composition.

In Examples and Comparative Examples, the combinations of the liquid composition and inks shown in Table 1 were used to conduct printing.

TABLE 1

|  | Ink Set | Liquid Composition |
|---|---|---|
| EXAMPLE 1 | 1 | Used |
| EXAMPLE 2 | 2 | Used |
| COMPARATIVE EXAMPLE 1 | 1 | Not Used |
| COMPARATIVE EXAMPLE 2 | 2 | Not Used |

<Evaluation Method and Evaluation Standard>

The recorded images obtained in EXAMPLES 1 and 2 and COMPARATIVE EXAMPLES 1 and 2 were evaluated in accordance with the following evaluation methods and evaluation standards. The results are shown in Table 2.

(Evaluation Methods of Recorded Image)

(1) Coloring Property:

RGB color charts of High-Definition XYZ·CIELAB·RGB Standard Image (SHIPP) (supervision: Committee of High-Definition Standard Image Preparation; publication: Image Electron Institute) were printed by means of the printer, and these color charts were subjected to colorimetry. The evaluation of color property was conducted by calculating three-dimensional broadenings of color distributions (hereinafter referred to as "color gamut volume") in accordance with the method set forth in the technical manual to compare them. At that time, image processing when forming printed images was conducted under the same conditions, and the colorimetry was conducted by a GRETAG SPECTRORINO under conditions of light source: D50 and visual field: 2° after 24 hours elapsed after the printing. The evaluation standard is given below. A ratio by color gamut volume to printed images (COMPARATIVE EXAMPLES 1 and 2) by an ink subset alone was used as an evaluation standard.

AAA: The color gamut volume ratio was more than 1.7 times;

AA: The color gamut volume ratio was 1.5 to 1.7 times;

A: The color gamut volume ratio was 1.4 to 1.5 times;

BB: The color gamut volume ratio was 1.2 to 1.4 times;

B: The color gamut volume ratio was 1.0 to 1.2 times;

C: The color gamut volume ratio was less than 1.0 time.

Incidentally, printing was separately conducted with the ink subset 1 on coated paper for ink-jet (Color BJ Paper LC-101, trade name, product of Canon Inc.) to form an image, thereby finding a color gamut volume ratio to the printed article obtained in COMPARATIVE EXAMPLE 1. As a result, it was found to be 1.3 times.

(2) Evenness:

After solid images were printed with the inks of yellow, magenta, cyan and black colors using the printer, color evenness as to whitish haze and color irregularity was visually evaluated. The evaluation standard is as follows:

A: Whitish haze and color irregularity scarcely occurred;

B: Whitish haze and color irregularity were slightly observed along fibers of paper, but which causes no problem in actual use;

C: Whitish haze and color irregularity were markedly observed along fibers of paper.

(3) Bleeding:

A liquid composition and each of yellow, magenta, cyan and black inks were used to print solid prints of the respective colors side by side with the plain paper default mode by means of BJF-8500, thereby visually observing the degree of bleeding at boundary portions between the respective colors.

AA: No bleeding was visually observed;

A: Bleeding was scarcely conspicuous;

B: Bleeding was observed, but which causes no problem in actual use;

C: Bleeding occurred to such an extent that boundary lines between the respective colors were indistinct.

TABLE 2

Evaluation results to printing

|  | Coloring Property | Evenness | Bleeding |
|---|---|---|---|
| EXAMPLE 1 | AAA | A | AA |
| EXAMPLE 2 | AAA | A | AA |
| COMPARATIVE EXAMPLE 1 | B | B | C |
| COMPARATIVE EXAMPLE 2 | B | B | C |

As described above, according to the present invention, there can be provided an ink-jet recording process by which the same excellent coloring property and color evenness as in coated paper for ink-jet are achieved when color ink-jet recording is conducted on plain paper in particular, and ink-jet recorded images free of bleeding between different colors are provided.

What is claimed is:

1. An ink set comprising an aqueous ink containing at least an ultrafinely particulate pigment as a coloring material and an aqueous liquid composition containing fine particles dispersed therein and electrically charged at the surface in a polarity opposite to the ink, in a dispersed state.

2. The ink set according to claim 1, wherein the fine particles in the liquid composition are so constituted that the coloring material is adsorbed on the surfaces of the fine particles while preventing the aggregation of the coloring material when the ink comes into contact with the liquid composition on a recording medium.

3. The ink set according to claim 1, wherein the volume average particle diameter of the ultrafinely particulate pigment is at most 60 nm, and the 90% cumulative particle diameter of the volume particle diameter distribution thereof is at most 100 nm.

4. The ink set according to claim 1, wherein the ultrafinely particulate pigment is a chromatic ultrafinely particulate organic pigment.

5. The ink set according to claim 1, wherein the ink is an anionic ink.

6. The ink set according to claim 5, wherein an anionic hydrophilic group is bonded directly or through another atomic group to the surface of the ultrafinely particulate pigment.

7. The ink set according to claim 5, wherein the ultrafinely particulate pigment is dispersed by a dispersing agent having an anionic group.

8. The ink set according to claim 5, wherein the zeta potential of the liquid composition is +5 to +90 mV.

9. The ink set according to claim 5, wherein the liquid composition further contains an acid to adjust the pH thereof to 2 to 7.

10. The ink set according to claim 1, wherein the ink is a cationic ink.

11. The ink set according to claim 10, wherein a cationic hydrophilic group is bonded directly or through another atomic group to the surface of the ultrafinely particulate pigment.

12. The ink set according to claim 10, wherein the ultrafinely particulate pigment is dispersed by a dispersing agent having a cationic group.

13. The ink set according to claim 10, wherein the zeta potential of the liquid composition is −5 to −90 mV.

14. The ink set according to claim 10, wherein the liquid composition further contains a base to adjust the pH thereof to 7 to 12.

15. The ink set according to claim 1, wherein the ink and the liquid composition are suitable for use in ink-jet recording.

16. A process for forming a colored portion, comprising the steps of:
   (i) applying an anionic or cationic aqueous ink containing an ultrafinely particulate pigment as a coloring material to a recording medium; and
   (ii) applying an aqueous liquid composition containing fine particles dispersed therein and electrically charged at the surface in a polarity opposite to the ink,
   wherein the ink and the liquid composition are applied so as to come into contact with each other in a liquid state on the surface of the recording medium.

17. The forming process according to claim 16, wherein the step (i) is performed after performing at least the step (ii).

18. The forming process according to claim 16, wherein the step (ii) is performed after performing at least the step (i).

19. The forming process according to claim 17, wherein the step (ii) is performed after performing at least the step (i), and the step (i) is then performed again.

20. The forming process according to claim 16, wherein at least one of the step (i) and the step (ii) is performed by an ink-jet recording method of a system making use of ejection through an orifice in correspondence with a recording signal.

21. The forming process according to claim 20, wherein the ink-jet recording method is a method in which thermal energy is caused to act in correspondence with a recording signal to eject the aqueous ink or the liquid composition through an orifice.

22. An ink-jet recording apparatus comprising a first recording unit equipped with a container part which contains an anionic or cationic aqueous ink containing an ultrafinely particulate pigment as a coloring material and an ink-jet head for ejecting the ink, and a second recording unit equipped with an aqueous liquid composition container part which contains a liquid composition containing fine particles dispersed therein and electrically charged at the surface in a polarity opposite to the ink and an ink-jet head for ejecting the liquid composition.

23. An ink-jet recording apparatus comprising an ink container part which contains an anionic or cationic aqueous ink containing an ultrafinely particulate pigment as a coloring material, a liquid composition container part which contains an aqueous liquid composition containing fine particles dispersed therein electrically charged at the surface in a polarity opposite to the ink and ink-jet heads for independently ejecting the ink contained in the ink container part and the liquid composition contained in the liquid composition container part.

* * * * *

UNITED STATES PATENT AND TRADEMARK OFFICE
CERTIFICATE OF CORRECTION

PATENT NO. : 6,746,114 B2
DATED : June 8, 2004
INVENTOR(S) : Katsuhiko Takahashi et al.

It is certified that error appears in the above-identified patent and that said Letters Patent is hereby corrected as shown below:

Column 1,
Line 48, "technique." should read -- techniques. --

Column 3,
Line 22, "immobilize" should read -- immobilizing --.
Line 26, "topically" should read -- typically --.
Line 52, "in" should be deleted.

Column 7,
Line 20, "a" should read -- an --.

Column 8,
Line 26, "a" should be deleted.

Column 10,
Line 49, "contributes" should read -- contribute --.

Column 11,
Line 25, "a" should be deleted.
Line 36, "that" should read -- wherein --.
Line 43, "embodiment." should read -- embodiments. --.

Column 14,
Line 20, "thereto." should read -- thereto.
$-SO_2NH_3^+$,
$-SO_2NH_2COR^+$,
$-NH_3^+$,
$-NR_3^+$, --.

Column 19,
Line 11, "become" should read -- becomes --.

Column 20,
Line 35, "$(OH)_{2n}.mH_2O$" should read -- $(OH)_{2n} \cdot mH_2O$ --.

Column 23,
Line 3, "y" should read -- $\gamma$ --.

UNITED STATES PATENT AND TRADEMARK OFFICE
CERTIFICATE OF CORRECTION

PATENT NO. : 6,746,114 B2
DATED : June 8, 2004
INVENTOR(S) : Katsuhiko Takahashi et al.

It is certified that error appears in the above-identified patent and that said Letters Patent is hereby corrected as shown below:

Column 26,
Line 8, "dialkylurea and" should read -- and --.
Line 53, "suitable" should read -- suitably --.
Line 57, "inhibit" should be deleted.

Column 27,
Line 20, "stable" should read -- stably --.
Line 61, "become" should read -- becomes --.

Column 30,
Line 58, "suitable" should read -- suitably --.
Line 62, "inhibit" should be deleted.

Column 32,
Line 53, "an" should read -- a --.

Column 35,
Line 30, "illustrate" should read -- illustrated --.
Line 33, "operation." should read -- operations. --

Column 36,
Line 7, "be" should read -- by --.

Column 38,
Line 50, "illustrate" should read -- illustrated --.

UNITED STATES PATENT AND TRADEMARK OFFICE
CERTIFICATE OF CORRECTION

PATENT NO. : 6,746,114 B2
DATED : June 8, 2004
INVENTOR(S) : Katsuhiko Takahashi et al.

It is certified that error appears in the above-identified patent and that said Letters Patent is hereby corrected as shown below:

Column 39,
Line 33, "neutralize" should read -- neutralizing --.
Line 54, "to a" should read -- to an --.

Column 44,
Line 23, "results" should read -- results as --.

Signed and Sealed this

Twenty-first Day of September, 2004

JON W. DUDAS
*Director of the United States Patent and Trademark Office*